United States Patent
Horiuchi et al.

(10) Patent No.: US 7,115,704 B2
(45) Date of Patent: Oct. 3, 2006

(54) METHOD FOR PRODUCING A POLYARYLENE SULFIDE

(75) Inventors: Shunsuke Horiuchi, Nagoya (JP); Atsushi Ishio, Nagoya (JP); Kei Saitoh, Nagoya (JP)

(73) Assignee: TORAY Industries, Inc., Tokyo (JP)

( * ) Notice: Subject to any disclaimer, the term of this patent is extended or adjusted under 35 U.S.C. 154(b) by 24 days.

(21) Appl. No.: 10/897,028

(22) Filed: Jul. 23, 2004

(65) Prior Publication Data

US 2005/0043505 A1 Feb. 24, 2005

(30) Foreign Application Priority Data

Jul. 24, 2003 (JP) ............................. 2003-201426

(51) Int. Cl.
*C08G 75/04* (2006.01)

(52) U.S. Cl. ...................................... 528/381; 528/388

(58) Field of Classification Search ..................... None
See application file for complete search history.

(56) References Cited

U.S. PATENT DOCUMENTS

| | | | |
|---|---|---|---|
| 3,322,834 A | 5/1967 | Hill, Jr. et al. ............. | 260/609 |
| 3,354,129 A | 11/1967 | Edmonds, Jr. et al. ........ | 260/79 |
| 3,524,835 A | 8/1970 | Edmonds, Jr. et al. ..... | 260/79.1 |
| 4,794,161 A * | 12/1988 | Kato et al. .................. | 528/388 |
| 4,882,416 A * | 11/1989 | Senatore et al. ............ | 528/388 |
| 5,239,051 A | 8/1993 | Geibel et al. ................ | 528/388 |
| 5,350,833 A | 9/1994 | Inoue et al. ................. | 528/388 |

FOREIGN PATENT DOCUMENTS

| | | |
|---|---|---|
| EP | 0 302 218 A | 2/1989 |
| JP | 59-98133 A | 6/1984 |
| JP | 64-9229 A | 1/1989 |
| JP | 2004-137466 A | 5/2004 |
| JP | 2004-182910 A | 7/2004 |

* cited by examiner

*Primary Examiner*—Marc S. Zimmer
(74) *Attorney, Agent, or Firm*—Kubovcik & Kubovcik

(57) ABSTRACT

This invention provides a method for producing a polyarylene sulfide, comprising the step of bringing a low-hydrated alkali metal sulfide containing respectively 0.05 to less than 0.8 mole of water and an organic amide solvent per mole of the sulfur contained in the alkali metal sulfide, into contact with a dihalogenated aromatic compound in an organic polar solvent for polymerization. This invention also provides a polyarylene sulfide obtained by the method. The problem to be solved by this invention is to provide a method for efficiently producing a polyarylene sulfide in a short time using an alkali metal sulfide small in water content and organic amide solvent content.

6 Claims, No Drawings

METHOD FOR PRODUCING A POLYARYLENE SULFIDE

BACKGROUND OF THE INVENTION

1. Technical Field

The present invention relates to a method for producing a polyarylene sulfide. In more detail, it relates to a method for efficiently producing a polyarylene sulfide in a short time using an alkali metal sulfide small in water content and organic amide solvent content.

2. Background Art

In recent years, the peculiar physical properties of organic sulfur compounds, especially aliphatic sulfur compounds and aromatic sulfur compounds (thiols, thioketones, thioethers, thio-acids, etc.) attract attention, and they are popularly used in medicines, agricultural chemicals, industrial chemicals, etc. Furthermore, aromatic polymeric compounds having sulfur as bonds (polyarylene sulfides; hereinafter may be called PAS) are also produced in large amounts. Such a sulfur-containing aromatic polymeric compound is usually produced by a method of bringing a halogenated aromatic compound and an alkali metal sulfide into contact with each other for reaction and eliminating the alkali metal halide. For example, a polyarylene sulfide can be obtained by bringing a polyhalogenated aromatic compound and an alkali metal sulfide into contact with each other in an organic polar solvent for polymerization.

As a particular method for producing a PAS, it is proposed to let an alkali metal sulfide such as sodium sulfide and a polyhalogenated aromatic compound such as p-dichlorobenzene react with each other in an organic amide solvent such as N-methyl-2-pyrrolidone. However, only a PAS with a low molecular weight and a low melt viscosity can be obtained. As a usually practiced method, sodium sulfide containing a large amount of crystal water is heated in 1 or more moles of an organic amide solvent per mole of the sulfur contained in the sodium sulfide, to eliminate the water contained in the hydrated sodium sulfide for producing a sulfidizing agent, and p-dichlorobenzene is added to it, the mixture being then heated for polymerization. However, this method has such problems that a long time is necessary for eliminating water from the hydrated sodium sulfide, and that since 1.0 or more moles of water per mole of the sulfur contained in the sulfidizing agent remains in the sulfidizing agent obtained by this method, a long time is necessary also for obtaining a PAS (for example, see U.S. Pat. No. 3,354,129).

As a method for solving the problem of the above-mentioned method, i.e., to control the water content in the reaction system, the following method is disclosed: An alkali metal sulfide anhydrate with a purity of 95 wt % or more and containing 2 wt % or less of an alkali metal hydrosulfide as impurity is charged, and 0.1 to 0.8 mole of water per mole of the alkali metal sulfide is added into the polymerization system, to keep the molar concentration of the charged alkali metal sulfide in a range from 2.5 to 5 moles/liter based on the amount of an organic amide solvent, then the alkali metal sulfide and a dihalogenated aromatic compound being heated to react with each other in the solvent (for example, see U.S. Pat. No. 5,350,833). In this method, since an anhydrous alkali metal sulfide is used, the control of, for example, the water content in the system is easy, and it can be expected that the water content per mole of the sulfur contained in the system can be kept at 0.8 mole or less. However, this method essentially requires the use of an anhydrous alkali metal sulfide, and enormous energy and long time are necessary for obtaining it. So, the method cannot be satisfactory in view of commercial production. Furthermore, the polymerization degree of the PAS obtained by the method described in the document is not sufficiently high. The reason is considered to be that since an anhydrous alkali metal sulfide is highly deliquescent and likely to be oxidized unstably, it is liable to contain much impurities such as oxides, and that in the case where such an anhydrous alkali metal sulfide is used for producing a PAS, achieving a high polymerization degree is inhibited, allowing only a PAS with a low melt viscosity to be obtained.

Moreover, the following method is disclosed: One or more metal sulfides with a water/sulfide molar ratio of 1.2 or less, selected from alkali metal sulfides and alkaline earth metal sulfides are pretreated using at least one polymerization modifier compound selected from a group consisting of metal chlorides, metal carbonates and metal carboxylates and a slight amount of water at a temperature of 45 to 230° C., and the pretreated metal sulfides and a dihalogenated aromatic compound are made to react with each other (for example, see JP64-9229A). In this method, since a low-hydrated alkali metal sulfide with a water content of 0.5 mole per mole of the sulfur contained in the alkali metal sulfide is used for reaction, it can be expected to decrease the water content in the reaction system, but sodium sulfide 0.5-hydrate is used as the alkali metal sulfide. The sodium sulfide 0.5-hydrate is expensive since the method for producing it is complicated. So, the method is not suitable as an industrial process.

Still furthermore, a method for producing a polyphenylene sulfide (hereinafter may be abbreviated as a PPS) in a state where 0.3 to 0.95 mole of water per mole of the sulfur source remains in the reaction system (for example see JP59-98133A). This method is advantageous in view of cost, since cheap sodium sulfide nonahydrate is dehydrated for use. In this method, sodium sulfide nonahydrate is dehydrated by means of distillation in a large amount of an organic amide solvent. However, the organic amide solvent remaining in the reaction system after completion of dehydration is not eliminated to such an extent that the amount of the organic amide solvent becomes 0.05 to less than 0.8 per mole of the sulfur contained in the alkali metal sulfide. Therefore, the low-hydrated alkali metal sulfide obtained by this method contains a large amount of the organic amide solvent, and the sulfur content of the obtained mixture is very low. So, in the case where the low-hydrated alkali metal sulfide obtained by this method is used for synthesizing a compound having sulfur as bonds such as a PAS, since the sulfur content in the reaction system is low, the amount of the obtained PAS per unit volume is small, and in view of obtaining a PAS efficiently, the method is not satisfactory.

As a method for decreasing the water content of a reaction system using cheap raw materials, the following method is disclosed: A mixture is obtained by dehydrating an aqueous mixture of a sulfur source and a polar organic compound in which the molar ratio of the polar organic compound to the sulfur source is kept in a range from 0.15/1 to about 0.9/1, and the dehydrated mixture and a polyhalo-substituted aromatic compound are mixed, as desired in the presence of another additional polar organic compound, to produce a mixture to be polymerized, which is made to react for polymerization under conditions effective for causing the polymerization reaction (for example, see U.S. Pat. No. 5,239,051). In this method, the raw materials are cheap, and it can be expected that the low-hydrated alkali metal sulfide can be obtained cheaply. However, when the aqueous mixture of a sulfur source and a polar organic compound is dehydrated, the reactor made of a metal is corroded. So, the method has a problem that an expensive corrosion-preventive material must be used as the material of the reactor, and furthermore, it is difficult to obtain a PAS with a sufficiently high molecular weight.

SUMMARY OF THE INVENTION

The present invention has been achieved as a result of a study made to solve the above-mentioned problems of the prior art.

An object of this invention is to produce a polyarylene sulfide in a short time, using an alkali metal sulfide low in water content and organic amide solvent.

Furthermore, another object in a suitable embodiment of this invention is to provide a method for efficiently producing a polyarylene sulfide in a short time, using an economically and efficiently produced alkali metal sulfide small in water content and organic amide solvent content.

A further other object of this invention is to provide a polyarylene sulfide produced by the above-mentioned method.

To solve the above-mentioned problems, this invention employs the following means.

This invention provides a method for producing a polyarylene sulfide, comprising the step of bringing a low-hydrated alkali metal sulfide containing water and an organic amide solvent respectively by 0.05 mole to less than 0.8 mole per mole of the sulfur contained in the alkali metal sulfide, into contact with a dihalogenated aromatic compound in an organic polar solvent, for polymerization.

Furthermore, this invention provides said method for producing a polyarylene sulfide, wherein the low-hydrated alkali metal sulfide is produced by a method comprising the step of eliminating an organic amide solvent and water from a mixture containing at least (a) an alkali metal sulfide, (b) 0.8 to 10 moles of the organic amide solvent and (c) 0.8 to 20 moles of water, respectively per 1 mole of the sulfur contained in the alkali metal sulfide, to adjust the water content and the organic amide solvent content in the mixture respectively into a range from 0.05 mole to less than 0.8 mole per mole of the sulfur contained in the alkali metal sulfide.

Still furthermore, this invention provides said method for producing a polyarylene sulfide, wherein an alkali metal hydroxide is added during polymerization to further continue the polymerization. By this method, a polyarylene sulfide with a higher polymerization degree can be easily obtained.

Still furthermore, this invention provides a polyarylene sulfide produced according to said method for producing a polyarylene sulfide.

DETAILED DESCRIPTION OF THE INVENTION

This invention is described below in detail under the respective headings of "Alkali metal sulfide," "Organic amide solvent," "Water," "Low-hydrated alkali metal sulfide production process," "Produced low-hydrated alkali metal sulfide," "PAS," "Organic polar solvent," "dihalogenated aromatic compound," "Catalyst compound," "Polymerization modifier compound," "Molecular weight regulator, branching or crosslinking agent," "Polymerization stabilizer," "Polymerization process," "Polymer recovery," "Other posttreatment," and "Produced PAS," in this order.

(1) Alkali Metal Sulfide

This invention uses a low-hydrated alkali metal sulfide containing respectively 0.05 mole to less than 0.8 mole of water and an organic amide solvent per mole of the sulfur contained in the alkali metal sulfide. As the raw material of the low-hydrated alkali metal sulfide, it is desirable to use an alkali metal sulfide. Preferred particular examples of the alkali metal sulfide include lithium sulfide, sodium sulfide, potassium sulfide, rubidium sulfide, cesium sulfide and mixtures of two or more of the foregoing. Above all, sodium sulfide can be preferably used. These alkali metal sulfides can be used as hydrates, aqueous mixtures or anhydrates. An aqueous mixture refers to an aqueous solution, or a mixture of an aqueous solution and a solid ingredient, or a mixture of water and a solid ingredient. Since a generally available cheap alkali metal sulfide is a hydrate or an aqueous mixture, it is preferred to use an alkali metal sulfide as a hydrate or an aqueous mixture.

Furthermore, an alkali metal sulfide produced from an alkali metal hydrosulfide and an alkali metal hydroxide and/or an alkali metal hydroxide and hydrogen sulfide can also be used as said alkali metal sulfide. In the case where an alkali metal sulfide is produced from an alkali metal hydrosulfide and an alkali metal hydroxide, it is assumed that 1 mole of the alkali metal sulfide and 1 mole of water are produced from 1 mole of the alkali metal hydrosulfide and 1 mole of the alkali metal hydroxide. Furthermore, in the case where an alkali metal sulfide is produced from an alkali metal hydroxide and hydrogen sulfide, it is assumed that 1 mole of the alkali metal sulfide and 2 moles of water are produced from 2 moles of the alkali metal hydroxide and 1 mole of hydrogen sulfide.

Preferred particular examples of the alkali metal hydrosulfide include sodium hydrosulfide, potassium hydrosulfide, lithium hydrosulfide, rubidium hydrosulfide, cesium hydrosulfide and mixtures of two or more of the foregoing. Above all, sodium hydrosulfide can be preferably used. These alkali metal hydrosulfides can be used as hydrates, aqueous mixtures or anhydrates. A hydrate or an aqueous mixture is preferred in view of easy availability and cost. Moreover, hydrogen sulfide can be in any form of gas, liquid or aqueous solution.

Preferred particular examples of the alkali metal hydroxide include lithium hydroxide, sodium hydroxide, potassium hydroxide, rubidium hydroxide, cesium hydroxide and mixtures of two or more of the foregoing. Above all, sodium hydroxide can be preferably used. These alkali metal hydroxides can be used as hydrates, aqueous mixtures or anhydrates. A hydrate or an aqueous mixture is preferred in view of easy availability and cost. In the case where an alkali metal hydrosulfide is used, the used amount of the alkali metal hydroxide is in a range from 1.0 to 1.20 moles per mole of the sulfur contained in the alkali metal hydrosulfide. A preferred range is from 1.005 to 1.15 moles, and a more preferred range is from 1.02 to 1.10. In the case where hydrogen sulfide is used, the used amount of the alkali metal hydroxide is in a range from 2.0 to 2.40 moles per mole of hydrogen sulfide. A preferred range is from 2.01 to 2.30 moles, and a more preferred range is from 2.04 to 2.20 moles.

(2) Organic Amide Solvent

In this invention, it is desirable to use an organic amide solvent when the low-hydrated alkali metal sulfide is produced. Preferred particular examples of the organic amide solvent include N-alkylpyrrolidones such as N-methyl-2-pyrrolidone and N-ethyl-2-pyrrolidone, caprolactams such N-methyl-ε-caprolactam, 1,3-dimethyl-2-imidazolidinone, N,N-dimethylacetamide, N,N-dimethylformamide, hexamethylphosphoric acid triamide, and their mixtures. Among them, N-methyl-2-pyrrolidone (hereinafter may be abbreviated as NMP) can be preferably used.

It is desirable that the amount of the organic amide solvent used when the low-hydrated alkali metal sulfide begins to be produced is in a range from 0.8 to 10 moles per mole of the sulfur contained in the alkali metal sulfide. It is preferred that the lower limit is 0.85 mole or more. A more preferred lower limit is 0.9 mole or more, and a further more preferred lower limit is 0.95 mole or more. A still further more preferred lower limit is 1.1 moles or more. It is preferred that the upper limit is 3.0 moles or less. A more preferred upper limit is 2.0 moles or less, and a further more preferred upper limit is 1.5 moles or less. In the case where the amount is too small, if a metallic vessel is used for the reaction, a large amount of metals tends to be dissolved from the vessel, and in the case where the amount is too large, the time taken for the reaction becomes long, resulting in an economic disadvantage.

(3) Water

In this invention, it is desirable to use water when the low-hydrated alkali metal sulfide is produced. The water in this case means all the water existing in the reaction system in the stage when the low-hydrated alkali metal sulfide begins to be produced, including the water added to the reaction system, the water introduced into the reaction system as the hydrate or aqueous mixture of the alkali metal sulfide, the water introduced into the reaction system as a hydrous organic amide solvent, the water introduced into the reaction system as other hydrous compounds, etc. Furthermore, in the case where the alkali metal sulfide is produced from an alkali metal hydrosulfide and an alkali metal hydroxide and/or from an alkali metal hydroxide and hydrogen sulfide, the water produced with the production of the alkali metal sulfide is also included in the above-mentioned water. Moreover, in the case where water is obtained as a byproduct due to the reaction of any ingredient other than the above-mentioned ingredients made to coexist when the low-hydrated alkali metal sulfide is produced, the water is also included in the above-mentioned water.

It is desirable that the water content of the mixture used when the low-hydrated alkali metal sulfide begins to be produced is in a range from 0.8 to 20 moles per mole of the sulfur contained in the alkali metal sulfide. It is preferred that the lower limit is 1.0 mole or more, and a more preferred lower limit is 2.0 moles or more. It is preferred that the upper limit is 15 moles or less, and a more preferred upper limit is 10 moles or less. In the case where the amount is too small, if a metallic vessel is used for the reaction, a large amount of the metals tends to be dissolved from the vessel, and in the case where the amount is too large, a long time is taken for the reaction, resulting in an economic disadvantage.

(4) Low-Hydrated Alkali Metal Sulfide Production Process

It is preferred that the low-hydrated alkali metal sulfide used in this invention is obtained by a method of eliminating an organic amide solvent and water from a mixture containing at least an alkali metal sulfide, the organic amide solvent and water respectively by amounts in said respective ranges, to adjust the water content and the organic amide solvent content of the mixture respectively into a range from 0.05 mole to less than 0.8 mole per mole of the sulfur contained in the alkali metal sulfide. The water content and the organic amide solvent content of the mixture in this case refer to the amounts of the water and the organic amide solvent remaining after subtracting the amounts of water and the organic amide solvent eliminated from the reaction system, from the charged amounts (including the amounts produced from the charged raw materials).

It is desirable that the water content of the mixture remaining after eliminating water and the organic amide solvent from said mixture is in a range from 0.05 mole to less than 0.8 mole per mole of the sulfur contained in the alkali metal sulfide. A preferred range is from 0.1 to 0.75 mole, and a further more preferred range is from 0.1 to 0.7 mole. Moreover in the case where the production of the PAS described later is performed with the amount of the polymerization solvent kept small, it is preferred that the water content is in a range from 0.1 to 0.7 mole. A more preferred range is from 0.1 to 0.6 mole, and a further more preferred range is from 0.15 to 0.5 mole. Furthermore, it is desirable that the organic amide solvent content of the mixture remaining after eliminating water and the organic amide solvent from said mixture is in a range from 0.05 mole to less than 0.8 mole per mole of the sulfur contained in the alkali metal sulfide. A preferred range is from 0.1 to 0.75 mole, and a more preferred range is from 0.1 to 0.7 mole. Moreover in the case where the production of the PAS described later is performed with the amount of the polymerization solvent kept small, it is preferred that the organic amide solvent content is in a range from 0.1 to 0.7 mole. A more preferred range is from 0.1 to 0.6 mole, and a further more preferred range is from 0.15 to 0.5 mole. If the amount is too small, the viscosity of the produced low-hydrated alkali metal sulfide becomes too high in a tendency of involving handling inconvenience. In the case where the amount is too large, if this mixture is used, for example, for a condensation reaction with a halogenated compound, there is a tendency of requiring a long time for the reaction.

The method for adjusting the water content and the organic amide solvent content of the mixture into said ranges is not especially limited if adjustment is possible, but, for example, the following liquid elimination process can be preferably employed. That is, desirably in an inert gas atmosphere in a temperature range from room temperature to 150° C., preferably from room temperature to 100° C., a mixture containing at least an alkali metal sulfide, organic amide solvent and water is prepared and heated to 150° C. or higher, preferably 170° C. or higher at atmospheric pressure or under reduced pressure for distilling away the organic amide solvent and water. The preferred upper limit of the temperature at which the organic amide solvent and water are distilled away is 280° C. For promoting the distillation for eliminating the organic amide solvent and water, the mixture can be stirred during distillation, or desirably a stream of an inert gas can be fed for the distillation. Furthermore, for example, toluene can also be added for the distillation.

When the low-hydrated alkali metal sulfide is produced using the above-mentioned liquid elimination process, it is preferred that the liquid elimination process includes at least the following two steps.

Step 1: The mixture is treated for liquid elimination at a temperature not higher than the boiling point of the organic amide solvent, to adjust the water content of the mixture into a range from 0.8 mole to 2.0 moles per mole of the sulfur contained in the charged alkali metal sulfide.

Step 2: The mixture obtained in the step 1 is treated for liquid elimination at a temperature not lower than the boiling point of the organic amide solvent for eliminating water and the organic amide solvent, to adjust the water content and the organic amide solvent content of the mixture respectively into a range from 0.05 mole to less than 0.8 mole per mole of the sulfur contained in the alkali metal sulfide.

In this case, it is preferred to perform the step 2 continuously in succession to the step 1, and in addition to these steps, there can be such an additional step as a pretreatment step or a posttreatment step. The steps 1 and 2 can be performed in the same reactor, or the reaction mixture can be transfused from the reactor used for the step 1 into a different reactor for performing the step 2. The steps 1 and 2 are described below in detail.

[Step 1] In this invention, it is preferred that the mixture containing at least an alkali metal sulfide, an organic amide solvent and water by amounts in said ranges is treated for liquid elimination at a temperature not higher than the boiling point of the organic amide solvent, to adjust the water content into a range from 0.8 to 2.0 moles per mole of the sulfur contained in the charged alkali metal sulfide in the step 1. A more preferred range is from 0.9 to 1.7 moles, and a further more preferred range is from 0.95 to 1.5 moles. In the case where the amount is too large or too small, if a metallic vessel is used for the reaction, the amount of the metals dissolved from the vessel tends to be larger. The liquid elimination method is not especially limited, but, for example, a liquid elimination step of heating in said inert gas at atmospheric pressure or under reduced pressure can be employed. It is preferred that the liquid elimination in the step 1 is performed at a temperature not higher than the boiling point of the organic amide solvent, and the particular temperature cannot be generally specified, since it depends on the organic amide solvent used and the chemical composition of the mixture to be treated for liquid elimination. However, it is more preferred that the temperature is 230° C. or lower, and an especially preferred range is 210° C. or lower. In the case the temperature is kept in this range, if a metallic vessel is used for the reaction, the amount of the metals dissolved from the metallic vessel tends to be small. The lower limit of the temperature is not especially specified, if the water can be eliminated into the desired range. However, in view of liquid elimination efficiency, it is preferred that the temperature is 150° C. or higher, and a more preferred range is 170° C. or higher. Furthermore, in the liquid elimination of the step 1, the organic amide solvent can also be distilled away together with water. However, in the step 1, it is preferred that the amount of the organic amide solvent in the reaction system is 0.8 mole or more per mole of the sulfur contained in the alkali metal sulfide. A more preferred range is 0.9 mole or more, and a further preferred range is 0.95 mole or more. An especially preferred range is 1.1 moles or more. In the case where the amount is kept in this range, if a metallic vessel is used, the amount of the metals dissolved from the vessel tends to be kept further smaller. Therefore, in the case where the organic amide solvent is also dissolved away together with water in the liquid elimination of the step 1, it is preferred that the eliminated organic amide solvent would be separated again and returned into the reaction system. For example, rectification can be used as a method for separating the organic amide solvent.

[Step 2] In this invention, the mixture prepared in the step 1 is treated for liquid elimination at a temperature not lower than the boiling point of the organic amide solvent, to eliminate water and the organic amide solvent, for adjusting the water content and the organic amide solvent content of the mixture respectively into a range from 0.05 mole to less than 0.8 mole per mole of the sulfur contained in the alkali metal sulfide in the step 2. The water content of the mixture remaining after eliminating water and the organic amide solvent in the step 2 is in a range from 0.05 mole to less than 0.8 mole per mole of the sulfur contained in the alkali metal sulfide. A preferred range is from 0.1 to 0.75 mole, and a more preferred range is from 0.1 to 0.7 mole. Moreover, in the case where the low-hydrated alkali metal sulfide of this invention is used for producing the PAS described later with the amount of the polymerization solvent kept small, it is preferred that the water content is in a range from 0.1 to 0.7 mole. A more preferred range is from 0.1 to 0.6 mole, and a further more preferred range is from 0.15 to 0.5 mole. The organic amide solvent content is in a range from 0.05 mole to less than 0.8 mole per mole of the sulfur contained in the alkali metal sulfide. A preferred range is from 0.1 to 0.75 mole, and a more preferred range is from 0.1 to 0.7 mole. Moreover, in the case where the low-hydrated alkali metal sulfide of this invention is used for producing the PAS described later with the amount of the polymerization solvent kept small, it is preferred that the organic amide solvent content is in a range from 0.1 to 0.7 mole. A more preferred range is from 0.1 to 0.6 mole, and a further more preferred range is from 0.15 to 0.5 mole. If the amount is too small, the viscosity of the produced low-hydrated alkali metal sulfide becomes too high in a tendency of involving handling inconvenience. In the case where the amount is too large, if the mixture is used, for example, for a reaction with a halogenated aromatic compound, there is a tendency of requiring a long time for the reaction. The method for adjusting the organic amide solvent content and the water content of the mixture is not especially limited. For example, a liquid elimination step of heating in said inert gas at atmospheric pressure or under reduced pressure can be employed. It is preferred that the liquid elimination of the step 2 is performed at a temperature not lower than the boiling point of the organic amide solvent. The particular temperature cannot be generally specified, since it depends on the organic amide solvent used and the chemical composition of the mixture treated for liquid elimination. A more preferred range is higher than the boiling point of the organic amide solvent. A further more preferred range is 210° C. or higher, and an especially preferred range is 230° C. or higher. If the temperature is in this range, the elimination of water and the organic amide solvent tends to be completed in a short time. The upper limit of the temperature is not especially specified, if the water content and the organic amide solvent content are respectively in said range. However, a preferred range is 280° C. or lower, and a more preferred range is 270° C. or lower.

(5) Produced Low-Hydrated Alkali Metal Sulfide

Since the low-hydrated alkali metal sulfide produced like this is quantitatively adjusted in water content, it can be especially suitably used for being brought into contact with a dihalogenated aromatic compound in an organic polar solvent for producing a polyarylene sulfide. However, it can also be mixed to react with other compounds as desired suitably for respective purposes. For example, it can be suitably used for condensation reactions with various halogenated compounds.

(6) PAS

A PAS in this invention is a homopolymer or copolymer containing recurring units represented by formula —(Ar—S)— as main structural units, preferably containing 80 mol % or more of said recurring units. In the formula, Ar denotes a unit represented, for example, by any of the following formulae (A) to (K). It is especially preferred that Ar is represented by the formula (A).

(A) 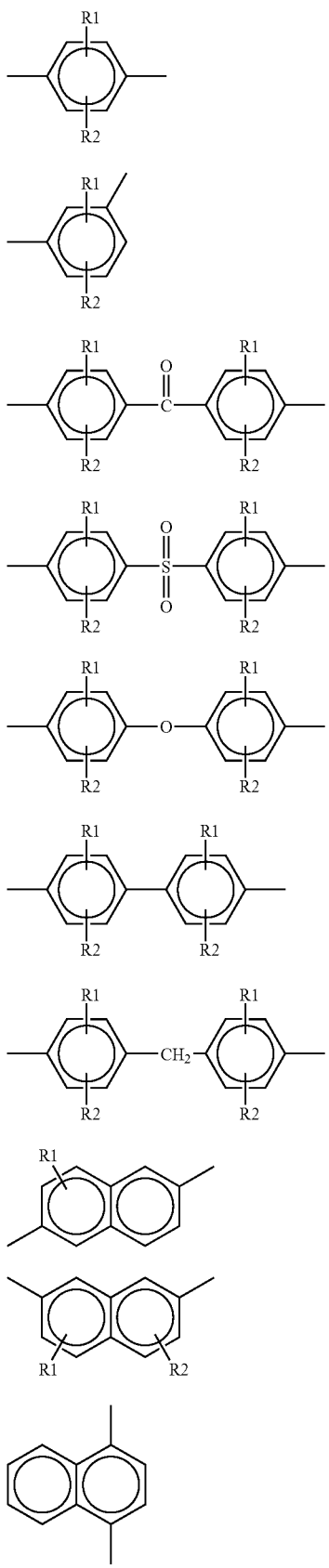
(B)
(C)
(D)
(E)
(F)
(G)
(H)
(I)
(J)

(K) 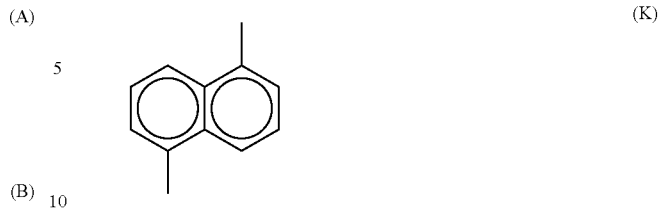

(where R1 and R2 denote, respectively independently, a substituent group selected from hydrogen, alkyl group, alkoxy group and halogen group.)

If the recurring units are main structural units, the PAS can also contain a small amount of branch units or crosslinking units represented, for example, by the following formulae (L) to (N). It is preferred that the copolymerized amount of these branch units or crosslinking units is in a range from 0 to 1 mole % for each mole of the —(Ar—S)— units.

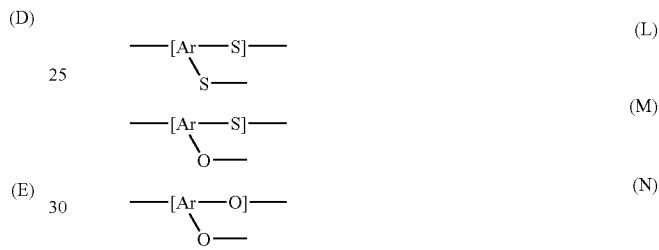

Furthermore, the PAS of this invention can also be a random copolymer, black copolymer or their mixture, respectively containing said recurring units.

Moreover, the molecular weight of the PAS is not especially limited, but usually it is preferred that the melt viscosity is in a range from 5 to 5,000 Pa·s (300° C., shear rate 1000/sec).

Typical examples of the PAS include polyphenylene sulfides, polyphenylene sulfide sulfones, polyphenylene sulfide ketones, their random copolymers, block copolymers, mixtures, etc. An especially preferred PAS is a polyphenylene sulfide (hereinafter may also be abbreviated as a PPS) containing 80 mol % or more, especially 90 mol % or more of p-phenylene sulfide units

as the main structural units of the polymer, or can also be a polyphenylene sulfide sulfone or polyphenylene sulfide ketone.

(7) Organic Polar Solvent

In the production of a PAS of this invention, it is necessary to use an organic polar solvent as the polymerization solvent. It is preferred to use an organic amide solvent. Preferred particular examples of the organic polar solvent include aprotic organic solvents such as N-alkylpyrrolidones such as N-methyl-2-pyrrolidone and N-ethyl-2-pyrrolidone; caprolactams such as N-methyl-ε-caprolactam; 1,3-dimethyl-2-imidazolidinone; N,N-dimethylacetamide; N,N- dimethylformamide; and hexamethylphosphoric acid triamide; and their mixtures, since they are high in the stability of the reaction. Among them, N-methyl-2-pyrrolidone can be preferably used. Since the organic amide solvent preferably used when the low-hydrated alkali metal sulfide of this invention is produced can also be used as an organic polar solvent, the organic amide solvent contained in the low-hydrated alkali metal sulfide can also be regarded as an organic polar solvent.

In this invention, the amount of the organic polar solvent used as the polymerization solvent of the PAS is not especially limited, but, for example, it can be in a range from 0.2 to 15 moles per mole of the sulfur contained in the low-hydrated alkali metal sulfide. However, in the production of a PAS using the low-hydrated alkali metal sulfide of this invention, even if the used amount of the polymerization solvent is smaller than the amounts used in the methods of the prior art, a PAS suitable for various commercial resin applications such as injection molding and extrusion molding can be produced. So, it is preferred that the amount of the organic polar solvent used as the polymerization solvent is, for example, in a range from 1.0 to 4.0 moles per mole of the sulfur contained in the low-hydrated alkali metal sulfide. A more preferred range is from 1.0 to 3.5 moles, and a further more preferred range is from 1.5 to 3.2 moles. In the case where it is desired to remarkably improve the polymer productivity, an especially preferred range is, for example, from 1.5 to 2.5 moles. In general, if the used amount of the polymerization solvent is smaller, the amount of the polymer produced per unit volume is larger, resulting in an economic advantage. However, if the amount is too small, an undesirable reaction is likely to occur. If the amount is too large, the increase of the polymerization degree tends to be unlikely to occur, resulting in an economic disadvantage. Furthermore, even if the amount is too large or too small, the time taken for the reaction tends to be longer, resulting in an economic disadvantage. In this case, the amount of the organic polar solvent in the reaction system is the amount obtained by subtracting the amount of the organic polar solvent eliminated outside the reaction system, from the amount of the organic polar solvent introduced into the reaction system.

(8) Dihalogenated Aromatic Compound

Examples of the dihalogenated aromatic compound used in the production of a PAS of this invention include dihalogenated benzenes such as p-dichlorobenzene, o-dichlorobenzene, m-dichlorobenzene and p-dibromobenzene, dihalogenated aromatic compounds also containing a substituent group other than a halogen such as 1-methoxy-2,5-dichlorobenzene and 3,5-dichlorobenzoic acid. Above all, a dihalogenated aromatic compound mainly containing a p-dihalogenated benzene typified by p-dichlorobenzene is preferred. Especially preferred is a dihalogenated aromatic compound containing 80 to 100 mol % of p-dichlorobenzene. Further more preferred is a dihalogenated aromatic compound containing 90 to 100 mol % of p-dichlorobenzene. Furthermore, to produce a PAS copolymer, two or more different dihalogenated aromatic compounds can also be used in combination.

It is preferred that the used amount of the dihalogenated aromatic compound is in a range from 0.9 to 2.0 moles per mole of the sulfur of the low-hydrated alkali metal sulfide, since a polyarylene sulfide with a viscosity suitable for processing can be obtained. A more preferred range is from 0.95 to 1.5 moles, and a further more preferred range is from 1.005 to 1.2 moles.

(9) Catalyst Compound

In this invention, when a low-hydrated alkali metal sulfide is brought into contact with a dihalogenated aromatic compound in an organic polar solvent for polymerization, it is preferred that at least a part of the polymerization is performed in the presence of at least one compound (hereinafter may be called a catalyst compound) selected from organic metal carboxylates, aliphatic cyclic amine compounds, N-heteroaromatic compounds, organic sulfoxide compounds, etc. In this case, the reaction rate of polymerization can be enhanced, and even if the used amount of the polymerization solvent is very small, the polymerization reaction tends to easily progress. Enhancing the reaction rate shortens the process time necessary for the polymerization reaction, and using a small amount of the polymerization solvent increases the amount of the polymer produced per unit volume of the reactor. So, these matters are important for producing the polymer with an economic advantage. Among the catalyst compounds, it is preferred to use an organic metal carboxylate, since it can be used also as the polymerization modifier compound described later. The action of the catalyst compound for enhancing the reaction rate tends to be exhibited when the existing amount of water is in a range from 0.05 to 0.8 mole per mole of the sulfur contained in the reaction system. A more preferred range of water is from 0.05 to less than 0.8 mole, and a further more preferred range is from 0.1 to 0.6 mole. An especially preferred range is from 0.15 to 0.5 mole. It is advantageous to perform the polymerization reaction using the low-hydrated alkali metal sulfide of this invention from this point of view. The reason why the catalyst compound can enhance the reaction rate is not clear, but it is presumed that the catalyst compound makes any interaction with the alkali metal sulfide in the reaction system, to enhance the solubility of the alkali metal sulfide into the reaction system, for enhancing the contact probability between the alkali metal sulfide and the dihalogenated aromatic compound, thereby enhancing the reaction rate.

Preferred examples of the organic metal carboxylate are compounds represented by general formula R(COOM)n (where R denotes an alkyl group with 1 to 20 carbon atoms, cycloalkyl group, aryl group, alkylaryl group, arylalkyl group, aminoalkyl group, N-alkylaminoalkyl group with 2 to 20 carbon atoms, and N-phenylaminoalkyl group; among them, an alkyl group, aryl group or alkylaminoalkyl group is preferred: M denotes an alkali metal selected from lithium, sodium, potassium, rubidium and cesium or an alkaline earth metal selected from magnesium, calcium, strontium and barium; and n denotes an integer of 1 to 3). The organic metal carboxylate can be, for example, one compound selected from lithium acetate, sodium acetate, potassium acetate, magnesium acetate, calcium acetate, lithium propionate, sodium propionate, potassium propionate, lithium 4-hydrobutyrate, sodium 4-hydroxybutyrate, lithium N-methyl-4-aminobutyrate, sodium N-methyl-4-aminobutyrate, lithium N-ethyl-4-aminobutyrate, sodium N-ethyl-4-aminobutyrate, lithium N-phenyl-4-aminobutyrate, sodium N-phenyl-4-aminobutyrate, lithium valerate, sodium benzoate, sodium phenylacetate and potassium p-toluylate, or any of their mixtures. An organic metal carboxylate can also be formed by adding virtually equal chemical equivalents of an organic acid and one or more compounds selected from a group consisting of alkali metal hydroxides, alkali metal carbonate and alkali metal bicarbonates, for reaction. Among the organic metal carboxylates enumerated above, lithium salts are highly soluble in the reaction system and large in the catalytic effect, but expensive, and potassium, rubidium, cesium and alkaline earth metal salts are considered to be poor in the solubility in the reaction system. Sodium salts can be preferably used since they are cheap and moderately soluble in the polymerization system.

The aliphatic cyclic amine compound can be, for example, a compound selected from piperazine, piperidine, pyrrolidine, N,N'-dimethylpiperazine, 1,4-diazabicyclo[2,2,2]octane, 1,5-diazabicyclo[4,3,0]-non-5-ene, 1,8-diazabicyclo[5,4,0]-7-undecene, 1,5-diazabicyclo[4,4,0]-5-nonene, and hexamethylenetetramine, or any of their mixtures, etc.

The N-heteroaromatic compound can be, for example, one compound selected from pyridine, pyridazine, pyrimidine, sym-triazine, sym-tetrazine, quinoline, isoquinoline, quinazoline, 1,5-naphthyridine, pteridine, acridine, phenazine and phenanthridine, or any of their mixtures, etc.

The organic sulfoxide compound can be, for example, dimethyl sulfoxide and/or tetramethylene sulfoxide.

Among the catalyst compounds enumerated above, sodium acetate is especially preferred, since it is cheap and easily available.

At least one catalyst compound selected from organic metal carboxylates, aliphatic cyclic amine compounds, N-heteroaromatic compounds and organic sulfoxide compounds can be used as a hydrate or an aqueous solution. As for the used amount of the catalyst compound, if 0.001 to 1.0 mole of the catalyst compound per mole of the sulfur contained in the reaction system is made to exist in the reaction system, an especially large reaction promoting effect tends to be obtained. A preferred range of the catalyst compound is from 0.01 to 0.7 mole, and a more preferred range is from 0.02 to 0.6 mole. A further more preferred range is from 0.05 to 0.45. Therefore, in order to obtain the PAS in a short time, it is desirable that the used amount of the catalyst compound is in said range.

(10) Polymerization Modifier Compound

When a PAS is produced according to the method of this invention, a polymerization modifier compound can also be used to obtain a PAS with a high polymerization degree in a shorter time. The polymerization modifier compound in this case refers to a substance that acts to increase the viscosity of the obtained PAS. Particular examples of the polymerization modifier compound include organic metal carboxylates, water, alkali metal chlorides, organic metal sulfonates, alkali metal sulfates, alkaline earth metal oxides, alkaline metal phosphates, alkaline earth metal phosphates, etc. Any one of them can be used, or two or more of them can also be used simultaneously. Among them, an organic metal carboxylate and/or water can be preferably used.

Preferred examples of the organic metal carboxylate include the compounds represented by general formula R(COOM)n (where R denotes an alkyl group with 1 to 20 carbon atoms, cycloalkyl group, aryl group, alkylaryl group or arylalkyl group: M denotes an alkali metal selected from sodium, potassium, rubidium and cesium: and n denotes an integer of 1 to 3). The organic metal carboxylate can be used also as a hydrate or an aqueous solution. Particular examples of the organic metal carboxylate include lithium acetate, sodium acetate, potassium acetate, sodium propionate, sodium benzoate, sodium phenylacetate, potassium p-toluylate, their mixtures, etc. The organic metal carboxylate can also be formed by adding virtually equal chemical equivalents of an organic acid and one or more compounds selected from a group consisting of alkali metal hydroxides, alkali metal carbonate and alkali metal bicarbonates for reaction. Among the organic metal carboxylates, potassium, rubidium and cesium salts are considered to be poor in the solubility in the reaction system, and sodium acetate can be preferably used since it is cheap and moderately soluble in the reaction system.

In the case where an organic metal carboxylate is used as the catalyst compound, it may exhibit both the effect as a catalyst compound and the effect as a polymerization modifier compound.

It is preferred that the used amount of the organic metal carboxylate is in a range from 0.01 to 0.7 mole per mole of the sulfur contained in the reaction system. A more preferred range is from 0.02 to 0.6 mole, and a further more preferred range is from 0.05 to 0.45 mole. If the amount is smaller than said range, the effect of enhancing the polymerization degree tends to be insufficient, and even if the amount is larger than said range, the effect of further enhancing the polymerization degree tends to be little obtained.

In the case where water is used as the polymerization modifier compound, it is preferred to include a step in which the amount of water in the polymerization system is in a range from 0.8 to 5.0 moles per mole of the sulfur contained in the reaction system. The amount of water in the polymerization system should be in said range in the stage when the conversion of the dihalogenated aromatic compound is 60 mol % or more as described later. A preferred range is 70% or more, and a more preferred range is 80% or more. A further more preferred range is 90% or more. A more preferred range in the amount of water in the polymerization system is from 0.8 to 2.0 moles per mole of the sulfur contained in the reaction system. A further more preferred range is from 0.85 to 1.8 moles. In this case, if the amount of water is smaller than said range, a sufficient effect of enhancing the polymerization degree may not be obtained. On the other hand, if the amount is larger than the range, the polymerization time becomes longer on the contrary, and in addition the pressure in the reactor rises greatly, requiring a reactor having higher pressure resistance. These are undesirable in view of both economy and safety.

Furthermore, in the case where water is used as the polymerization modifier compound, it is preferred to use an organic metal carboxylate simultaneously, and in this case, the effect as the polymerization modifier compound can be further enhanced. So, a PAS with a high polymerization degree tends to be obtained in a short time even if the used amount of the polymerization modifier compound is smaller. A preferred range in the amount of water in this case is in a range from 0.8 to 2.0 moles per mole of the sulfur contained in the reaction system. A more preferred range is from 0.85 to 1.8 moles. Moreover, a preferred range in the used amount of the organic metal carboxylate is from 0.02 to 0.6 mole per mole of the sulfur contained in the reaction system. A more preferred range is from 0.05 to 0.45 mole.

(11) Molecular Weight Regulator and Branching or Crosslinking Agent

When the PAS of this invention is produced, a molecular weight modifier (it is not absolutely required to use an aromatic compound) such as a monohalogenated compound can be used together with said dihalogenated aromatic compound for forming the ends of the produced PAS or for adjusting the polymerization reaction or molecular weight. Furthermore, for forming a branched or crosslinked polymer, it is also possible to use a branching or crosslinking agent such as a trihalogenated or other polyhalogenated compound (it is not absolutely required to use an aromatic compound), an active hydrogen-containing halogenated aromatic compound or a halogenated aromatic nitro compound. As the polyhalogenated compound, a usually used compound can be used, and above all, a polyhalogenated aromatic compound is preferred. Particular examples of the polyhalogenated aromatic compounds include 1,3,5-trichlorobenzene, 1,2,4-trichlorobenzene, 1,2,4,5-tetrachlorobenzene, hexachlorobenzene, 1,4,6-trichloronapthalene, etc. Among them, 1,3,5-trichlorobenzene and 1,2,4-trichlorobenzene are preferred. As the active hydrogen-containing halogenated aromatic compound, for example, a halogenated aromatic compound having a functional group such as amino group, mercapto group or hydroxyl group can be used. Particular examples of the active hydrogen-containing halogenated aromatic compound include 2,5-dichloroaniline, 2,4-dichloroaniline, 2,3-dichloroaniline, 2,4,6-trichloroaniline, 2,2'-diamino-4,4'-dichlorodiphenyl ether, 2,4'-diamino-2',4-dichlorodiphenyl ether, etc. Particular examples of the halogenated aromatic nitro compound include 2,4-dinitrochlorobenzene, 2,5-dichloronitrobenzene, 2-nitro-4,4'-dichlorodiphenyl ether, 3,3'-dinitro-4,4'-dichlorodiphenylsulfone, 2,5-dichloro-2-nitropyridine, 2-chloro-3,5-dinitropyridine, etc.

(12) Polymerization Stabilizer

When the PAS of this invention is produced, a polymerization stabilizer can also be used for stabilizing the polymerization reaction system and preventing side reaction. The polymerization stabilizer contributes to the stabilization of the polymerization reaction system and inhibits the undesirable side reaction. An indicator of side reaction is the production of thiophenol, and the addition of the polymerization stabilizer allows the production of thiophenol to be inhibited. Particular examples of the polymerization stabilizer include compounds such as alkali metal hydroxides, alkali metal carbonates, alkaline earth metal hydroxides and alkaline earth metal carbonates. Among them, alkali metal hydroxides such as sodium hydroxide, potassium hydroxide and lithium hydroxide are preferred. Since any of the above-mentioned organic metal carboxylates also acts as a polymerization stabilizer, it is one of the polymerization stabilizers that can be used in this invention.

Any one of the polymerization stabilizers can be used, or two or more of them can also be used in combination. It is desirable that the used amount of the polymerization stabilizer is in a range from 0.01 to 0.2 mole per mole of the sulfur contained in the alkali metal sulfide in the reaction system before initiation of the polymerization reaction. A preferred range is from 0.03 to 0.1 mole. If the amount is too small, the stabilization effect may be insufficient. If the amount is too large on the contrary, an economic disadvantage occurs or the polymer yield tends to decline. In the case where the alkali metal sulfide is partially decomposed during reaction, to generate hydrogen sulfide, the alkali metal hydroxide produced as a result can also be the polymerization stabilizer.

(13) Polymerization Process

The polyarylene sulfide of this invention can be obtained if a low-hydrated alkali metal sulfide containing respectively 0.05 mole to less than 0.8 mole of water and an organic amide solvent per mole of the sulfur contained in the alkali metal sulfide is brought into contact with a dihalogenated aromatic compound in an organic polar solvent. It is preferred that the polymerization process includes the following steps A and B, since a PAS with a high polymerization degree can be obtained in a shorter time.

[Step A] It is preferred that this invention includes step A in which the low-hydrated alkali metal sulfide is brought into contact with a dihalogenated aromatic compound in an organic polar solvent in the presence of at least one compound selected from aliphatic cyclic amine compounds, N-heteroaromatic compounds and organic sulfoxide compounds.

It is preferred that the reaction in the step A is a polymerization reaction in which the reaction mixture of the above-mentioned ingredients is heated usually at a temperature of 120 to 300° C., preferably 180 to 260° C., more preferably 200 to 255° C. for 0.1 to 40 hours, preferably 0.5 to 20 hours, more preferably 1 to 10 hours. If the reaction temperature is lower than 120° C., the reaction rate is too low, and the reaction is likely to be very heterogeneous. On the other hand, if the temperature is higher than 300° C., the decomposition of the produced polymer and the deterioration of the solvent are likely to occur, and in addition, since the pressure in the reactor rises greatly, a reactor with high-pressure resistance is required undesirably in view of both economy and safety. Furthermore, the polymerization can be performed in one-step reaction at a constant temperature, or in multi-step reaction with the temperature raised stepwise, or in continuous reaction with the temperature raised continuously. However, it is preferred that the reaction is performed at a temperature of about 120 to 240° C. to inhibit the vehement reaction in the beginning of polymerization and subsequently at a temperature of 240 to 300° C. The reaction time of the step A cannot be generally specified, since it depends on the raw materials used, their amounts and the reaction temperature. However, if the reaction time is less than 0.1 hour, the amount of unreactive ingredients increases, and the produced polymer is likely to have a low molecular weight. If the reaction time is more than 40 hours, an economic disadvantage occurs.

Methods for the reaction of the step A in this invention are exemplified below. As one of the methods, the reactor is charged with an organic polar solvent, a dihalogenated aromatic compound, the low-hydrated alkali metal sulfide of this invention, and preferably a catalyst compound, and the mixture is sufficiently stirred for mixing in the reactor and heated for polymerization at the polymerization temperature. As another method, the reactor is charged with an organic polar solvent, the low-hydrated alkali metal sulfide of this invention and preferably a catalyst compound, and the mixture is sufficiently stirred for mixing in the reactor and heated to the polymerization temperature. Then, a dihalogenated aromatic compound is added for polymerization. As a further other method, the reactor is charged with an organic polar solvent, a dihalogenated aromatic compound and preferably a catalyst compound, and the mixture is sufficiently stirred in the reactor. Then, the low-hydrated alkali metal sulfide of this invention is added as a solid or slurry (of water or a solvent) for polymerization at the polymerization temperature. As a still further other method, the low-hydrated alkali metal sulfide of this invention is produced as a preliminary step, and an organic polar solvent, a dihalogenated aromatic compound and preferably a catalyst compound are added into the reaction vessel used in the preliminary step. Then, the mixture is sufficiently stirred for polymerization at the polymerization temperature. As a still further other method, as required, an organic polar solvent is added to the low-hydrated alkali metal sulfide of this invention synthesized in a reactor different from the reactor used in the step A, and the low-hydrated alkali metal sulfide or the mixture is transferred into the reactor used in the step A. Then, an organic polar solvent, a dihalogenated aromatic compound and preferably a catalyst compound are added, and the mixture is sufficiently stirred for polymerization at the polymerization temperature. As a still further other method, the reactor used in the step A is charged with an organic polar solvent, a dihalogenated aromatic compound and preferably a catalyst compound, and the low-hydrated alkali metal sulfide of this invention produced in a reactor different from the reactor used in the step A is added to them. The mixture is then sufficiently stirred for polymerization at the polymerization temperature. As a still further other method, the alkali metal sulfide of this invention is produced preferably in the presence of a catalyst compound in the same reactor as used in the step A, and an organic polar solvent and a dihalogenated aromatic compound are added into the reactor. The mixture is then sufficiently stirred for polymerization at the polymerization temperature. As a still further other method, the alkali metal sulfide of this invention is produced preferably in the presence of a catalyst compound in a reactor different from that used in the step A, and the alkali metal sulfide of this invention preferably containing the catalyst compound is transferred into the reactor used in the step A. Then, an organic polar solvent and a dihalogenated aromatic compound are added, and the mixture is sufficiently stirred for polymerization at the polymerization temperature.

When the reaction in the step A is initiated, that is, when the conversion of the dihalogenated aromatic compound (hereinafter may be abbreviated as DHA) charged into the reaction system is still 0, it is preferred that the amount of water in the reaction system is in a range from 0.05 mole to less than 0.8 mole per mole of the sulfur contained in the alkali metal sulfide of this invention. A more preferred range is from 0.1 to 0.75 mole, and a further more preferred range is from 0.1 to 0.7 mole. Furthermore, in the case where the PAS is produced using a small amount of a polymerization solvent, it is preferred that the amount of water is in a range from 0.1 to 0.7 mole. A more preferred range is from 0.1 to 0.6 mole, and a further more preferred range is from 0.15 to 0.5 mole. If the amount is too small, the polymerization reaction tends to be unlikely to progress, and if the amount is too large, the catalyst compound tends to be unlikely to exhibit its reaction promotion effect. Therefore, in the case where the ingredients other than the low-hydrated alkali metal sulfide of this invention contain water, it is preferred to dehydrate the respective ingredients before reaction, to adjust the amount of water in the reaction system. In the case where the amount of water in the reaction system is small, water can be added to keep the amount of water in said range. The conversion of a DHA refers to the value calculated from the following equation. The remaining amount of the DHA can be obtained usually by means of gas chromatography.

(a) In the case where a dihalogenated aromatic compound is added at an excessive molar ratio to the alkali metal sulfide:

Conversion=[[Charged amount of DHA (moles)−Remaining amount of DHA (moles)]/[Charged amount of DHA (moles)−Excessive amount of DHA (moles)]×100%

(b) In the other case than the above (a)

Conversion=[[Charged amount of DHA (moles)−Remaining amount of DHA (moles)]/[Charged amount of DHA (moles)]]×100%

The amount of the organic polar solvent used as the polymerization solvent in the step A can be, for example, in a range from 0.2 to 15 moles per mole of the sulfur contained in the reaction system. A preferred range is from 1.0 to 4.0 moles per mole of the sulfur contained in the reaction system, and a more preferred range is from 1.0 to 3.5 moles. A further more preferred range is from 1.5 to 2.5 moles. In the case where it is desired to remarkably improve the productivity of the polymer, an especially preferred range is from 1.5 to 2.5 moles. In general, if the used amount of the polymerization solvent is smaller, the amount of the polymer per unit volume is larger, resulting in an economic advantage. However, if the amount is too small, an undesirable reaction is likely to occur. If the amount is too large, the polymerization degree tends to be unlikely to rise, and an economic disadvantage may occur. Furthermore, if the amount is too large or too small, the time taken for the reaction tends to be longer, resulting in an economic disadvantage.

Furthermore, it is desirable to perform the following step B when the conversion of the dihalogenated aromatic compound in the polymerization process becomes 60 mol % or more, preferably 70% or more, more preferably 80% or more, further more preferably 90% or more.

[Step B] In the step B, the amount of water in the reaction system is adjusted into a range from 0.8 to 5.0 moles per mole of the sulfur contained in the reaction system, while polymerization is further continued. A preferred range in the amount of water is from 0.8 to 2.0 moles, and a more preferred range is from 0.85 to 1.8 moles. Performing the step B in succession to the step A is especially effective for obtaining a PAS with a high polymerization degree in a short time. If the amount of water is smaller than said range, the enhancement of the polymerization degree tends to be insufficient. On the other hand, if the amount is larger than said range, the pressure in the reactor tends to rise greatly, and a reactor with high-pressure resistance may be necessary. The method for adjusting the amount of water in the reaction system is not especially limited, but for example, water for making up for the shortage can be pressure-injected into the reaction system.

It is preferred that the step B is performed continuously in succession to the step A. The steps A and B can also be performed in the same reactor, or the reaction mixture of the step A can also be transferred into a different reactor for performing the step B.

It is preferred that the reaction in the step B is a polymerization reaction in which the reaction mixture of the above-mentioned ingredients is heated usually at a temperature of 120 to 300° C., preferably 200 to 300° C., more preferably 255 to 280° C. for 0.1 to 40 hours, preferably 0.2 to 20 hours, more preferably 0.5 to 10 hours. If the reaction temperature is lower than 120° C., the reaction rate is relatively low and the reaction is likely to be heterogeneous. On the other hand, if the temperature is higher than 300° C., the decomposition of the produced polymer and the deterioration of the solvent tend to be likely to occur, and furthermore, since the pressure in the reactor tends to rise greatly, a reactor with high-pressure resistance may be necessary undesirably in view of economy and safety. Furthermore, the polymerization can be performed in one-step reaction at a constant temperature, or in multi-step reaction with the temperature raised stepwise, or in continuous reaction with the temperature raised continuously. Moreover, the reaction time of the step B cannot be generally specified, since it depends on the raw materials used, their amounts and the reaction temperature. However, if the reaction time is less than 0.1 hour, the amount of unreactive ingredients increases, and the produced polymer tends to have a low molecular weight. If the reaction time is more than 40 hours, an economic disadvantage occurs.

Furthermore, the amount of the organic polar solvent used as the polymerization solvent in the step B can be, for example, in a range from 0.2 to 15 moles per mole of the sulfur contained in the reaction system. A preferred range is from 1.0 to 4.0 moles per mole of the sulfur contained in the reaction system, and a more preferred range is from 1.0 to 3.5 moles. A further more preferred range is from 1.5 to 3.2 moles. In the case where it is desired to remarkably enhance the productivity of the polymer, a range from 1.5 to 2.5 moles is especially preferred. In general, if the used amount of the polymerization solvent is smaller, the amount of the polymer per unit volume becomes larger, resulting in an economic advantage. However, if the amount is too small, an undesirable reaction is likely to take place. If the amount is too large, the polymerization degree tends to be unlikely to rise, resulting in an economic disadvantage. Moreover, if the amount is too larger or too small, the time taken for the reaction tends to be longer, resulting in an economical disadvantage.

For the polymerization of this invention, a publicly known polymerization operation such as batch operation or continuous operation can be employed. It is desirable that the atmosphere of the polymerization is a non-oxidizing atmosphere, and an inert gas atmosphere of nitrogen, helium, argon or the like is preferred. Especially in view of economy and easy handling, nitrogen is preferred. The reaction pressure is not especially limited, since it cannot be generally specified depending on the raw materials used, the solvent used, their amounts, reaction temperature, etc.

Moreover, to obtain a PAS with a high polymerization degree in a shorter time, it is preferred that at least a part of the overall polymerization process is performed in the presence of said polymerization modifier compound. The time when the polymerization modifier compound is added is not especially limited. It can be added at any point of time such as before starting the production of the low-hydrated alkali metal sulfide, at the start of the step A, during the step A, at the start of the step B or during the step B. It can also be added divisionally plural times. However, if at least the step B is performed in the presence of the polymerization modifier compound, a PAS with a high polymerization degree is likely to be obtained in a short time. The polymerization modifier compound can be added in any form, for example, as an anhydrate, a hydrate, an aqueous solution or a mixture with an organic polar solvent. However, in the case where the polymerization modifier compound contains water and is added at the start of the step A or during the step A, it is preferred that the amount of water per mole of the sulfur contained in the reaction system in the stage where the addition of the polymerization modifier compound is completed is in a range from 0.05 mole to less than 0.8 mole.

Furthermore, in order to obtain a PAS with a high polymerization degree, it is preferred to add an alkali metal hydroxide during polymerization to further continue polymerization. The effect of it is not clear, but it tends to stabilize the polymerization reaction especially when the conversion of the dihalogenated aromatic compound becomes high, and it is presumed that the reaction for enhancing the polymerization degree is likely to progress because of it. The time when the alkali metal hydroxide is added is not especially limited, if it is during polymerization. If the preferred time of addition is expressed in reference to the conversion of the dihalogenated aromatic compound, the time can be, for example, when the lower limit of the conversion is 60% or more, preferably 70% or more, more preferably 80% or more, and further more preferably 90% or more, and when the upper limit is 98% or less, preferably 95% or less. In the case where the time of addition is when the conversion is lower than the preferred lower limit, byproducts tend to increase, and in the case where the time is when the conversion is higher than the upper limit, the effect tends to be unlikely to be obtained. Among the alkali metal hydroxides, lithium hydroxide, sodium hydroxide and potassium hydroxide are preferred, and especially sodium hydroxide is preferred. The form of the alkali metal hydroxide is not especially limited, and it can be used in any form of an anhydrate, hydrate or aqueous mixture. However, an aqueous mixture is preferred in view of easy availability and easy handling. As the method for adding the alkali metal hydroxide as an aqueous mixture, for example, pressure injection into the reaction system can be employed.

In the case where after an alkali metal hydroxide has been added during polymerization, the alkali metal hydroxide is converted into another compound due to the action of any other compound than the alkali metal hydroxide already existing in the reaction system, the compound produced as a result of the conversion can also be regarded like the alkali metal hydroxide. That is, the compound produced as a result of the conversion can be added as the alkali metal hydroxide during polymerization.

The amount of the alkali metal hydroxide added during polymerization is not especially limited, but it is desirable that the added amount is in a range from 0.01 to 0.2 mole, preferably 0.02 to 0.15 mole per mole of the sulfur contained in the alkali metal sulfide in the reaction system before initiation of the polymerization reaction. If the amount is smaller than the range, it may be difficult to obtain the effect, and if the amount is too large, an economic disadvantage may occur, since it is difficult to obtain an additional effect.

In the case where the alkali metal hydroxide is added in a form containing water such as a hydrate or aqueous mixture, the amount of the water can be arbitrary, but in this case, since the amount of water in the reaction system changes after the alkali metal hydroxide is added, the amount of water contained in the alkali metal hydroxide should be noted. That is, as described before, if the time of adding the alkali metal hydroxide is during polymerization, there is no limit in the time of addition, and the alkali metal hydroxide can be added at any arbitrary stage in the steps A and B. However, in the case where the amount of water in the reaction system changes after the alkali metal hydroxide is added, it is desirable that the amount of water in the reaction system after the alkali metal hydroxide has been added is kept in the respectively preferred ranges in the steps A and B.

(14) Polymer Recovery

When the PAS of this invention is produced, the PAS is recovered from the solid containing the PAS, solvent, etc. obtained in the polymerization process after completion of polymerization process. The PAS can be recovered, for example, by any of the following methods. One of the methods is a flash method in which a polymerization reaction product is flushed from a high-temperature high-pressure (usually 250° C. or higher and 0.8 MPa or higher) state into an atmospheric pressure or reduced pressure atmosphere, for recovering the solvent and also for recovering the polymer as a powder or granular material. As another method, the polymerization reaction product is gradually cooled from a high-temperature high-pressure state for recovery. As a further other method, the polymerization reaction product is gradually cooled from a high-temperature high-pressure state to precipitate the PAS contained in the reaction system, and it is recovered by filtration at higher than 70° C., preferably higher than 100° C., as a solid containing the PAS. In this case, a state where the polymer is precipitated refers to a state where at least 60% or more of the produced polymer is not dissolved or molten in the polymerization solvent. In more detail, when the solid component in a polymer obtained by quickly cooling a reaction system of a certain state to lower than 100° C. is recovered using a 80-mesh sieve, the solid component can be recovered at a yield of 60% or more based on the weight of the PAS assumed to be obtained from all the charged low-hydrated alkali metal sulfide (based on the theoretical amount). If the moles of the sulfur contained in the alkali metal sulfide existing in the system before initiation of polymerization reaction are larger than the moles of the dihalogenated aromatic compound, there can be a case where not all is converted into the PAS. However, also in this case, consideration should be made based on the amount of the alkali metal sulfide existing in the system before initiation of polymerization reaction. A preferred mode in which the polymerization reaction product is gradually cooled from a high-temperature high-pressure state is, for example, a mode in which if the temperature for causing the polymer to be precipitated during cooling at an average rate of about 1° C./min from a state where at least 60% or more of the polymer is dissolved or molten in the polymerization solvent is Ts (° C.), the average cooling rate at least at Ts±10° C. is in a range from 0.01 to 2° C./min. In this case, the average cooling rate is the average rate calculated from the following formula based on the time period m (min) taken for cooling in a temperature range from a certain temperature t1 (° C.) to another certain temperature t2 (° C.).

Average cooling rate (° C./min)=[$t1$(° C.)−$t2$(° C.)]/$m$ (min)

Therefore, if the average cooling rate is in the above-mentioned range of cooling rate, the average cooling rate is not necessarily required to be constant, and there can be a constant temperature section. Multi-stage cooling can also be employed. The Ts (° C.) can be, for example, in a range from about 180° C. to about 250° C. in the above-mentioned preferred range of the used amount of the organic polar solvent.

It is preferred that the product containing a solid PAS obtained like this is washed using an organic solvent and/or water.

The particular method for washing the product containing a solid PAS using an organic solvent can be, for example, as follows. The organic solvent used for washing is not especially limited, if it does not act, for example, to decompose the PAS. Examples of the organic solvent include nitrogen-containing polar solvents such as N-methyl-2-pyrrolidone, dimethylformamide and dimethylacetamide, sulfoxide/sulfone-based solvents such as dimethyl sulfoxide and dimethyl sulfone, ketone-based solvents such as acetone, methyl ethyl ketone, diethylketone and acetophenone, ether-based solvents such as dimethyl ether, dipropyl ether and tetrahydrofuran, halogen-based solvents such as chloroform, methylene chloride, trichloroethylene, ethylene dichloride, dichloroethane, tetrachloroethane and chlorobenzene, alcohol/phenol-based solvents such as methanol, ethanol, propanol, butanol, pentanol, ethylene glycol, propylene glycol, phenol, cresol and polyethylene glycol, aromatic hydrocarbon-based solvents such as benzene, toluene and xylene. Among these organic solvents, N-methyl-2-pyrrolidone, acetone, dimethylformamide and chloroform are preferred, and N-methyl-2-pyrrolidone and/or acetone is more preferred. Any one of these organic solvents can be used, or two of more of them can also be used as a mixture.

As the method for washing using an organic solvent, for example, the PAS can be immersed in the organic solvent, and as required, stirring or heating can also be employed.

The washing temperature at which the PAS is washed using an organic solvent is not especially limited, and an arbitrary temperature can be selected in a range from room temperature to about 300° C. At a higher washing temperature, the washing efficiency tends to be higher, but usually at a washing temperature in a range from room temperature to 150° C., a sufficient effect can be obtained.

As for the ratio of the PAS and the organic solvent, it is preferred that the amount of the organic solvent is larger. Usually, a bath ratio of 300 g or less of the PAS to one liter of the organic solvent is selected.

In the case where the method of gradually cooling the polymerization reaction product from a high-temperature high-pressure state for recovering the reaction product is used to obtain the product containing a solid PAS as a slurry containing a granular PAS, it is preferred to filter the slurry and then to wash the PAS using an organic solvent. If this procedure is followed, when the used amount of the organic solvent is the same, a higher washing effect can be usually obtained. The filtration method is not especially limited, and, for example, filtration using a sieve, filtration by centrifugal separation or filtration using a filter cloth can be used.

For eliminating the remaining organic solvent and ionic impurities from the product containing a solid PAS, it is preferred to wash several times using water.

As a method for washing the PAS using water, the PAS can be, for example, immersed in water, and as required, stirring or heating can also be used.

It is preferred that the washing temperature at which the PAS is washed using water is in a range from 20° C. to 220° C. A more preferred range is from 50° C. to 200° C. If the temperature is lower than 20° C., it is difficult to eliminate byproducts, and if the temperature is higher than 220° C., a high pressure occurs undesirably in view of safety.

It is preferred that the water used for washing is distilled water or deionized water. As required, an aqueous solution containing an organic acid compound such as formic acid, acetic acid, propionic acid, butyric acid, chloroacetic acid, dichloroacetic acid, acrylic acid, crotonic acid, benzoic acid, salicylic acid, oxalic acid, malonic acid, succinic acid, phthalic acid or fumaric acid, or any of their alkali metal salts and alkaline earth metal salts, an inorganic acid compound such as sulfuric acid, phosphoric acid, hydrochloric acid, carbonic acid or silicic acid, or ammonium ions can also be used.

In the operation for hot water treatment of washing using 100° C. or higher temperature water, usually, a predetermined amount of the PAS is fed into a predetermined amount of water, and the mixture is heated and stirred at room temperature or in a pressure vessel. As for the ratio of PAS and water, it is preferred that the amount of water is larger. Usually a bath ratio of 200 g or less of a PAS to 1 liter of water is selected.

(15) Other Posttreatment

The PAS obtained like this is dried at atmospheric pressure and/or under reduced pressure. It is preferred that the drying temperature is in a range from 120 to 280° C. A more preferred range is from 140 to 250° C. The drying atmosphere can be any of an inert atmosphere of nitrogen, helium or reduced pressure, an oxidizing atmosphere such as oxygen or air, and a mixed atmosphere of air and nitrogen. However, an atmosphere of reduced pressure is preferred, and it is especially preferred to dry at atmospheric pressure for eliminating water and the like and then, to dry again under reduced pressure. It is preferred that the drying time is in a range from 0.5 to 50 hours. A more preferred range is from 1 to 30 hours, and a further more preferred range is from 1 to 20 hours.

The PAS obtained in this invention can also be treated at a temperature of 130 to 260° C. for eliminating the volatile component or for crosslinking and enhancing the molecular weight.

In the case where the dry heat treatment is performed for the purpose of eliminating the volatile component while inhibiting crosslinking and the enhancement of molecular weight, it is preferred that the temperature is in a range from 130 to 250° C. A more preferred range is from 160 to 250° C. Furthermore, it is desirable that the oxygen concentration is less than 5 vol %. A more desirable range is less than 2 vol %. Drying under reduced pressure is also one of preferred methods. It is preferred that the treatment time is in a range from 0.5 to 50 hours. A more preferred range is from 1 to 20 hours, and a further more preferred range is from 1 to 10 hours.

In the case where the dry heat treatment is performed for the purpose of crosslinking and enhancing the molecular weight, it is preferred that the temperature is in a range from 160 to 260° C. A more preferred range is from 170 to 250° C. Furthermore, it is desirable that the oxygen concentration is 5 vol % or more. A more desirable range is 8 vol % or more. It is preferred that the treatment time is from 1 to 100 hours. A more preferred range is from 2 to 50 hours, and a further more preferred range is from 3 to 25 hours.

The device for heat treatment can be an ordinary hot air dryer or a rotary heater or a heater with stirring blades. However, for efficient and more homogeneous treatment, it is preferred to use a rotary heater or a heater with stirring blades.

(16) Produced PAS

The PAS obtained in this invention is excellent in heat resistance, chemicals resistance, flame retardancy, electric properties and mechanical properties, and can be applied not only for injection molding, injection-compression molding and blow molding, but also for extrusion molding, to be molded into such articles as sheets, films, fibers and pipes. Furthermore, the PAS obtained in this invention has high whiteness, and can be used not only for applications requiring high whiteness but also suitably for applications requiring coloring. The whiteness can be expressed as the L value obtained by measuring a dry granular polymer using, for example, a colorimeter. For extensive applications of the PAS, it is preferred that the whiteness of PAS is 55 or more as L value. A more preferred range is 60 or more.

The PAS obtained in this invention can used alone, or as desired, can be mixed with an inorganic filler such as glass fibers, carbon fibers, titanium oxide or calcium carbonate, antioxidant, thermal stabilizer, ultraviolet light absorber and coloring agent. Moreover, it can also be mixed with an resin such as a polyamide, polysulfone, polyphenylene ether, polycarbonate, polyether sulfone, polyethylene terephthalate, polybutylene terephthalate, polyethylene, polypropylene, polytetrafluoroethylene, olefin-based copolymer having functional groups such as epoxy groups, carboxyl groups, carboxylate groups or acid anhydride groups, polyolefin-based elastomer, polyether ester elastomer, polyether amide elastomer, polyamideimide, polyacetal or polyimide.

The PAS can be applied, for example, as electric and electronic parts such as sensors, LED lamps, connectors, sockets, resistors, relay cases, switches, coil bobbins, capacitors, variable capacitor cases, optical pickups, oscillators, various terminal boards, transformers, plugs, printed boards, tuners, speakers, microphones, headphones, small motors, magnetic head bases, power modules, semiconductors, liquid crystals, FDD carriages, FDD chassis, motor brush holders, parabola antennas and computer-related parts; household and office electric appliance parts such as VTR parts, TV parts, irons, hair dryers, rice cooker parts, electronic ovens, voice apparatus parts including acoustic parts, audio laser discs (registered trademark) and compact discs, illumination parts, refrigerator parts, air conditioner parts, typewriter parts and word processor parts; machine-related parts such as office computer-related parts, telephone set-related parts, facsimile-related parts, copier-related parts, washing jigs, motor parts, lighters and typewriters; optical apparatuses such as micrometers, binoculars, cameras and timepieces, and precision machine-related parts; water-related parts such as water tap parts, mixing valves for water combination faucets, pump parts, pipe joints, water quantity control valves, relief valves, water temperature sensors, water quantity sensors and water meter housings; motor vehicle-related parts such as valve alternator terminals, alternator connectors, IC regulators, potentiometer bases for light deer, various valves such as exhaust gas valves, various pipes for fuel, exhaust gas system and suction system, air intake nozzle snorkels, intake manifolds, fuel pumps, engine cooling water joints, carburetor main bodies, carburetor spacers, exhaust gas sensors, cooling water sensors, oil temperature sensors, throttle position sensors, crankshaft position sensors, air flow meters, brake pad wear sensors, thermostat bases for air conditioners, warming hot air flow control valves, brush holders for radiator motors, water pump impellers, turbine vanes, wiper motor-related parts, distributors, starter switches, starter relays, wire harnesses for transmissions, window washer nozzles, air conditioner panel switch boards, coils for electromagnetic valves for fuel, connectors for fuses, horn terminals, electric equipment part insulating plates, step motor rotors, lamp sockets, lamp reflectors, lamp housings, brake pistons, solenoid bobbins, engine oil filters, fuel tanks, igniter cases, car speed sensors and cable liners, and other various articles.

As a method for producing a PAS film composed of the PAS obtained in this invention, a publicly known melt film formation process can be employed. For example, the PAS is molten in a single-screw or double-screw extruder and is extruded from a film die, being cooled on a cooling drum, to form a film. The film formed like this can also be biaxially oriented using a longitudinal roller-stretcher and a lateral stretcher called a tenter. The method for producing the film is not limited to this method.

The PAS film obtained like this has excellent mechanical properties, electric properties and heat resistance, and can be suitably used for various articles such as dielectric films of film capacitors and chip capacitors, circuit boards, insulation boards, motor insulation films, transformer insulation films, and releasing films.

As the method for producing PAS fibers composed of the PAS obtained in this invention, a publicly known melt spinning method can be used. For example, the PAS chips as a raw material are fed into a single-screw or double-screw extruder while they are kneaded, and the PAS is guided through the polymer streamline shunt, filtration layer and the like installed at the tip of the extruder, being extruded from the nozzle plate, cooled, stretched and thermally set. The method is not limited to this method.

The PAS monofilaments or short fibers obtained like this can be suitably used for various articles such as papermaking dryer canvas, net conveyors and bug filters.

EXAMPLES

The method of this invention is described below more particularly in reference to examples and comparative examples, but is not limited thereto or thereby. The physical properties were measured according to the following methods.

(1) Polymer Yield

The yield of a PAS is the rate of the produced amount of a PAS to the weight of the PAS assumed to be obtained by conversion from all the sulfur contained in the reactor before initiation of polymerization (theoretical amount). In the case where the charged amount of sulfur is more than that of the dihalogenated aromatic compound, it cannot happen that all the sulfur is converted into the PAS. However, even in this case, the yield is considered based on the amount of the sulfur contained.

(2) Melt Viscosity of Polymer

Capillograph C1 (die length 10 mm, die hole diameter 1 mm) produced by Toyo Seiki Co., Ltd. was used to measure the melt viscosity at a shear rate of 1000/sec at 300° C., for comparison.

(3) Measurement of Whiteness

Color computer SM-3 produced by Suga Test Instrument Co., Ltd. was used to measure the L value of the granular polymer obtained after drying.

Example 1

Step 1

A 1-liter autoclave made of SUS316 and having a stirrer was charged with 116.9 g of 48 wt % sodium hydrosulfide aqueous solution (1.0 mole as sodium hydrosulfide), 193.8 g of 21.7 wt % sodium hydroxide aqueous solution obtained by dissolving 96% pure sodium hydroxide into 150 g of water (1.05 moles as sodium hydroxide), 99.1 g (1.0 mole) of NMP and 21.3 g (0.26 mole) of anhydrous sodium acetate at room temperature. On the assumption that all the charged sodium hydrosulfide was converted into sodium sulfide, the amount of water per mole of the sulfur contained in sodium sulfide was 12.7 moles (228.8 g), and the amount of NMP was 1.0 mole.

A rectification tower containing a packing material was attached to the top of the autoclave through a valve, and nitrogen was fed at atmospheric pressure. With stirring, the reaction system was heated gradually up to the boiling point of NMP (205° C.), taking about 1.5 hours, for liquid elimination, to obtain 205 g of a distillate.

The distillate was analyzed by means of gas chromatography, and found to contain 203.5 g of water and 1.5 g of NMP. At this stage, it was found that 25.3 g (1.40 moles) of water and 97.6 g (0.98 mole) of NMP remained in the reaction system.

Step 2

Heating was continued in succession, to raise the temperature gradually up to about 260° C., taking about 1.5 hours, to obtain 90 g of a distillate. The distillate was analyzed by means of gas chromatography, and found to contain 20.3 g of water and 69.5 g of NMP. It was found that 5.0 g (0.28 mole) of water and 28.2 g (0.28 mole) of NMP remained in the reaction system.

In the steps 1 and 2, the amount of hydrogen sulfide scattered from the reaction system was 0.003 mole.

According to the method of this invention, low-hydrated sodium sulfide containing 0.28 mole of water per mole of the sulfur contained could be produced, and the obtained low-hydrated sodium sulfide was lightly pinkish white. After the reaction product was recovered, the reactor had been colored brown to some extent only in the wetted portions, but metallic gloss had remained. It was found that the reactor was not remarkably corroded due to the reaction.

Polymerization for Synthesis of PPS

After completion of the above step 2, the valve at the top of the autoclave was closed. Then, the obtained reaction system was cooled to about 160° C., and 149.5 g (1.02 moles) of p-dichlorobenzene (p-DCB) and 170.1 g (1.72 moles) of NMP were added. At this stage, the amount of water per mole of the sulfur contained in the reaction system was 0.28 mole, and the amount of NMP was 2.0 mole. The reaction vessel was sealed in nitrogen gas, and with stirring at 400 rpm, and the temperature was raised from 200° C. to 230° C., taking 30 minutes, and kept at 230° C. for 120 minutes. Then, the temperature of the reaction system was raised from 230° C. to 240° C., taking 10 minutes, while 18.9 g (1.05 moles) of water was pressure-injected into the reaction system. As a result, the amount of water in the reaction system per mole of the sulfur contained in the reaction system became 1.33 moles. Subsequently, the temperature was raised from 240° C. to 270° C., taking 30 minutes, and kept at 270° C. for 60 minutes. The reaction system was then cooled gradually to 200° C., taking 70 minutes, and quickly cooled near to room temperature. Then, the content was taken out.

The content was like a slurry having polymer particles dispersed in it, and light gray. After the content was taken out, the inner wall of the reactor had been colored brown to some extent only in the wetted portions, but metallic gloss had remained. It was found that even when a PPS was synthesized in succession to the synthesis of low-hydrated sodium sulfide, no remarkable corrosion occurred.

Recovery of Polymer

The content was diluted with 0.5 liter of NMP, to make a slurry, and it was stirred at 85° C. for 30 minutes and filtered using an 80-mesh wire net, to obtain a solid. The obtained solid was washed again with 0.5 liter of NMP, and the mixture was filtered. The obtained solid was washed again with 1 liter of water (70° C.) three times, and the mixture was filtered. To the obtained solid, 0.52 g of acetic acid and 1 liter of water (70° C.) were added, for washing, and the mixture was filtered. Furthermore, the obtained solid was washed again with 1 liter of water (70° C.), and the mixture was filtered.

The solid obtained like this was dried in hot air at 130° C., to obtain a dry polymer. As a result of identification by infrared spectroscopic analysis, the obtained solid was found to be a PPS. The yield of the polymer was 82%, and the melt viscosity of the polymer was 125 Pa·s. The whiteness (L value) was 60. It was found that according to the method of this invention, even when the used amount of the polymerization solvent was very slight, a polymer with a high polymerization degree could be obtained at a high yield, and that the reactor used for producing the polymer was slightly corroded.

Comparative Example 1

Step 1

A 1-liter autoclave made of SUS316 and having a stirrer was charged with 116.9 g of 48 wt % sodium hydrosulfide aqueous solution (1.0 mole as sodium hydrosulfide), 193.8 g of 21.7 wt % sodium hydroxide aqueous solution obtained by dissolving 96% pure sodium hydroxide into 150 g of water (1.05 moles as sodium hydroxide), 29.7 g (0.30 mole) of NMP and 21.3 g (0.26 mole) of anhydrous sodium acetate at room temperature. On the assumption that all the charged sodium hydrosulfide was converted into sodium sulfide, the amount of water per mole of the sulfur contained in sodium sulfide was 12.7 moles (228.8 g), and the amount of NMP was 0.3 mole.

A rectification tower containing a packing material was attached to the top of the autoclave through a valve, and nitrogen was fed at atmospheric pressure. With stirring, the reaction system was heated gradually up to the boiling point of NMP (205° C.), taking about 1 hour, for liquid elimination, to obtain 205 g of a distillate.

The distillate was analyzed by means of gas chromatography, and found to contain 204.5 g of water and 1.5 g of NMP. At this stage, it was found that 24.3 g (1.35 moles) of water and 29.2 g (0.29 mole) of NMP remained in the reaction system.

Step 2

Heating was continued in succession, to raise the temperature gradually up to about 235° C., taking about 1 hour, to obtain 19 g of a distillate. The distillate was analyzed by means of gas chromatography, and found to contain 18.1 g of water and 0.5 g of NMP. It was found that 6.2 g (0.34 mole) of water and 28.7 g (0.29 mole) of NMP remained in the reaction system.

In the steps 1 and 2, the amount of hydrogen sulfide scattered from the reaction system was 0.0005 mole.

Low-hydrated sodium sulfide containing 0.34 mole of water per mole of the sulfur contained could be produced. However, the obtained low-hydrated sodium sulfide was more blackish than that obtained in Example 1, and especially the portions in contact with the reactor were colored black. Furthermore, the surface of the reactor was discolored black, and the metallic gloss perfectly vanished. The black material on the surface of the reactor was elementally analyzed, and as a result, it was found that the material contained a large amount of heavy metals such as chromium and iron as impurities. That is, it was found that the low-hydrated sodium sulfide obtained in Comparative Example contained a large amount of heavy metals as impurities.

In Comparative Example 1, it was possible to synthesize low-hydrated sodium sulfide, but it was found that metals were remarkably dissolved from the reactor.

Polymerization for Synthesis of PPS

After completion of the above step 2, the valve at the top of the autoclave was closed. Then, the obtained reaction system was cooled to about 160° C., and 149.5 g (1.02 moles) of p-dichlorobenzene (p-DCB) and 169.5 g (1.71 moles) of NMP were added. At this stage, the amount of water per mole of the sulfur contained in the reaction system was 0.34 mole, and the amount of NMP was 2.0 mole. The reaction vessel was sealed in nitrogen gas, and with stirring at 400 rpm, and the temperature was raised from 200° C. to 230° C., taking 30 minutes, and kept at 230° C. for 120 minutes. Then, the temperature of the reaction system was raised from 230° C. to 240° C., taking 10 minutes, while 17.7 g (0.99 moles) of water was pressure-injected into the reaction system. As a result, the amount of water in the reaction system per mole of the sulfur contained in the reaction system became 1.33 moles. Subsequently, the temperature was raised from 240° C. to 270° C., taking 30 minutes, and kept at 270° C. for 60 minutes. The reaction system was then cooled gradually to 200° C., taking 70 minutes, and quickly cooled near to room temperature. Then, the content was taken out.

The content was a slurry having polymer particles dispersed in it, and was black. After the content was taken out, the surface of the reactor was discolored black, and the metallic gloss perfectly vanished. The black material on the surface of the reactor was elementally analyzed, and as a result, it was found that the material contained a large amount of heavy metals such as chromium and iron.

From the obtained content, the polymer was recovered according to the same method as described for Example 1. Infrared spectroscopic analysis was used for identification, and the obtained solid was found to be a PPS. The yield of the polymer was 81%, and the melt viscosity of the polymer was 95 Pa·s. The whiteness (L value) was 47.

From the comparison between Example 1 and Comparative Example 1, it can be seen that when a low-hydrated alkali metal sulfide is produced, the low-hydrated alkali metal sulfide can be synthesized even if the used amount of the organic amide solvent does not conform to this invention, but that metals are remarkably dissolved from the reactor during synthesis, causing heavy metal-based impurities to be mixed in the obtained low-hydrated alkali metal sulfide, and further that the PPS synthesized using the alkali metal sulfide is insufficient in polymerization degree.

Comparative Example 2

Step 1

A 1-liter autoclave made of SUS316 and having a stirrer was charged with 116.9 g of 48 wt % sodium hydrosulfide aqueous solution (1.0 mole as sodium hydrosulfide), 193.8 g of 21.7 wt % sodium hydroxide aqueous solution obtained by dissolving 96% pure sodium hydroxide into 150 g of water (1.05 moles as sodium hydroxide), 99.1 g (1.0 mole) of NMP and 21.3 g (0.26 mole) of anhydrous sodium acetate at room temperature. On the assumption that all the charged sodium hydrosulfide was converted into sodium sulfide, the amount of water per mole of the sulfur contained in sodium sulfide was 12.7 moles (228.8 g), and the amount of NMP was 1.0 mole.

A rectification tower containing a packing material was attached to the top of the autoclave through a valve, and nitrogen was fed at atmospheric pressure. With stirring, the reaction system was heated gradually up to the boiling point of NMP (205° C.), taking about 1 hour, for liquid elimination, to obtain 204 g of a distillate.

The distillate was analyzed by means of gas chromatography, and found to contain 202.5 g of water and 1.5 g of NMP. At this stage, it was found that 26.3 g (1.46 moles) of water and 97.6 g (0.98 mole) of NMP remained in the reaction system.

Step 2

Heating was continued in succession, to raise the temperature gradually up to about 235° C., taking about 1 hour, to obtain 8 g of a distillate. The distillate was analyzed by means of gas chromatography, and found to contain 6.0 g of water and 2.0 g of NMP. It was found that 20.3 g (1.13 mole) of water and 95.6 g (0.96 mole) of NMP remained in the reaction system.

In the steps 1 and 2, the amount of hydrogen sulfide scattered from the reaction system was 0.012 mole.

Polymerization for Synthesis of PPS

The valve at the top of the autoclave was closed, and in succession, the reaction system was cooled to about 160° C. Then, 148.1 g (1.008 mole) of p-dichlorobenzene (p-DCB) and 102.6 g (1.04 moles) of NMP were added. At this stage, the amount of water in the reaction system was 1.13 moles per mole of the sulfur contained in the sulfidizing agent, and the amount of NMP was 2.0 moles. The reaction vessel was sealed in nitrogen gas, and with stirring at 400 rpm, the temperature was raised from 200° C. to 230° C., taking 30 minutes, and kept at 230° C. for 120 minutes. Subsequently, the temperature of the reaction system was raised from 230° C. to 240° C., taking 10 minutes, while 3.7 g (0.20 mole) of water was pressure-injected into the reaction system. As a result, the amount of water in the reaction system per mole of the sulfur contained in the reaction system became 1.33 moles. Then, the temperature was raised from 240° C. to 270° C., taking 30 minutes, and kept at 270° C. for 60 minutes. Subsequently, the reaction system was cooled gradually to 200° C., taking 70 minutes, and then quickly cooled to room temperature. The content was taken out.

The obtained content had a strong p-DCB smell, and even if it was attempted to recover the intended polymer as described for Example 1, it could not be obtained. After the content was taken out, the reactor had been discolored brown to some extent in the wetted portions, but was not remarkably corroded.

It can be seen that when the alkali metal sulfide is synthesized, the dissolution of metals from the reactor can be inhibited if the organic amide solvent conforms to the method of this invention, but that if the amount of the organic amide solvent and the amount of water in the reaction system after elimination of the organic amide solvent and water do not conform to this invention, it is difficult to synthesize a PPS using the reaction system.

Example 2

The low-hydrated sodium sulfide obtained by the same operation as described for step 2 of Example 1 was used to synthesize a PPS. This example shows the results obtained by using polymerization conditions different from those of Example 1.

Polymerization for Synthesis of PPS

The operation up to the step 2 was performed as described for Example 1, and the valve at the top of the autoclave was closed. Then, the obtained reaction system was cooled to about 200° C., and a 100 ml pressure vessel communicating with the interior of the autoclave was attached to the top of the autoclave through a pressure valve. The interior of the autoclave was sealed in nitrogen gas. The 100 ml pressure vessel was used to pressure-inject 149.5 g (1.02 moles) of liquid p-dichlorobenzene (p-DCB) and 170.1 g (1.72 moles) of NMP into the autoclave using pressure nitrogen. At this stage, the amount of water per mole of the sulfur contained in the reaction system was 0.28 mole, and the amount of NMP was 2.0 moles. With stirring at 400 rpm, the temperature was raised from 200° C. to 238° C., taking 38 minutes, and kept at 238° C. for 90 minutes. Subsequently, the temperature of the reaction system was raised from 238° C. to 250° C., taking 12 minutes, while 18.9 g (1.05 moles) of water was pressure-injected into the reaction system. As a result, the amount of water in the reaction system per mole of the sulfur contained in the reaction system became 1.33 moles. Then, the temperature was raised from 250° C. to 270° C., taking 20 minutes, and kept at 270° C. for 90 minutes. Subsequently the temperature was lowered from 270° C. to 250° C., taking 15 minutes, and lowered gradually from 250° C. to 220° C., taking 75 minutes. The reaction system was then quickly cooled near to room temperature, and the content was taken out.

The form of the content and the state of the reactor after taking out the content were almost similar to those of Example 1. The yield of the polymer obtained after recovery work was 82%, and the melt viscosity of the polymer was 120 Pa·s. The whiteness (L value) was 59.

Example 3

An operation was performed as described for Example 2, except that water was pressure-injected into the reaction system in the cooling stage from 270° C. to 250° C. after keeping the temperature at 270° C. for 90 minutes in "Polymerization for synthesis of PPS" in Example 2, instead of pressure-injecting water into the reaction system in the heating stage after keeping the temperature at 238° C. for 90 minutes.

The form of the content and the state of the reactor after taking out the content were almost similar to those of Example 1. The yield of the polymer obtained after recovery work was 86%, and the melt viscosity of the polymer was 108 Pa·s. The whiteness (L value) was 60.

Example 4

This example shows the results of synthesizing a PPS using the low-hydrated sodium sulfide synthesized to have a water content different from that of Examples 1 to 3.

Step 1

A 1-liter autoclave made of SUS316 and having a stirrer was charged with 116.9 g of 48 wt % sodium hydrosulfide aqueous solution (1.0 mole as sodium hydrosulfide), 193.8 g of 21.7 wt % sodium hydroxide aqueous solution obtained by dissolving 96% pure sodium hydroxide into 150 g of water, 119.0 g (1.2 moles) of NMP and 12.3 g (0.15 mole) of anhydrous sodium acetate at room temperature. At this stage, the amount of water per mole of the sulfur contained in sodium sulfide on the assumption that all the charged sodium hydrosulfide was converted into sodium sulfide was 12.7 moles (228.8 g) and the amount of NMP was 1.2 moles.

A rectification tower containing a packing material was attached to the top of the autoclave through a valve, and nitrogen was fed at atmospheric pressure. With stirring, the reaction system was gradually heated up to the boiling point of NMP (205° C.), taking about 1.5 hours, for liquid elimination, to obtain 205 g of a distillate.

The distillate was analyzed by means of gas chromatography, and found to contain 202.5 g of water and 2.5 g of NMP, and it was found that at this stage, 26.3 g (1.46 moles) of water and 116.5 g (1.17 moles) of NMP remained in the reaction system.

Step 2

The heating was continued in succession, and the temperature was raised gradually up to about 245° C., taking about 1.5 hours, to obtain 77.2 g of a distillate. The distillate was analyzed by means of gas chromatography, and found to contain 16.3 g of water and 60.9 g of NMP. Thus, it was found that 10.0 g (0.56 mole) of water and 55.5 g (0.56 mole) of NMP remained in the reaction system, and that low-hydrated sodium sulfide containing 0.56 mole of water per mole of the sulfur contained could be produced.

The amount of the hydrogen sulfide scattered from the reaction system in the steps 1 and 2 was 0.003 mole.

Polymerization for Synthesis of PPS

The low-hydrated sodium sulfide obtained in the above was used to synthesize a PPS.

An operation was performed as described for Example 3, except that 150.7 g (1.03 moles) of p-DCB and 167.5 g (1.69 moles; hence, the amount of NMP per mole of the sulfur contained in the reaction system became 2.25 moles) of NMP were added and that the amount of water pressure-injected into the reaction system in the cooling stage from 270° C. to 250° C. was 22.3 g (1.24 moles; hence the amount of water per mole of the sulfur contained in the reaction system became 1.8 moles).

The form of the obtained content was almost similar to that of Example 1. The inner wall of the reactor remaining after taking out the content was similar to that of Example 1, but colored rather weakly. The yield of the polymer obtained by recovery work was 87%, and the melt viscosity of the polymer was 112 Pa·s. The whiteness (L value) was 65.

Example 5

This example shows the results obtained when sodium hydroxide was added as an alkali metal hydroxide during polymerization. As described for Example 4, low-hydrated sodium hydrosulfide was synthesized, and it was used for polymerization to synthesize a PPS under the following conditions.

Polymerization for Synthesis of PPS

The operation up to the step 2 was performed as described for Example 4, and the valve at the top of the autoclave was closed. Then, the obtained reaction system was cooled to about 200° C., and a 100 ml pressure vessel communicating with the interior of the autoclave was attached to the top of the autoclave through a pressure valve. The interior of the autoclave was sealed in nitrogen gas. The 100 ml pressure vessel was used to pressure-inject 150.7 g (1.03 moles) of liquid p-dichlorobenzene (p-DCB) and 167.5 g (1.69 moles) of NMP into the autoclave using pressure nitrogen. At this stage, the amount of water per mole of the sulfur contained in the reaction system was 0.56 mole, and the amount of NMP was 2.25 mole. With stirring at 400 rpm, the temperature was raised from 200° C. to 238° C., taking 38 minutes, and kept at 238° C. for 90 minutes. Then, the temperature of the reaction system was raised from 238° C. to 270° C., taking 32 minutes. During the heating, at the stage when the temperature of the reaction system became 260° C., 12.8 g of a sodium hydroxide aqueous solution {obtained by dissolving 1.25 g (0.03 mole) of 96% pure sodium hydroxide into 11.5 g (0.64 mole) of water} was pressure-injected into the reaction system. As a result, the amount of water in the reaction system per mole of the sulfur contained in the reaction system became 1.2 moles. The temperature was raised to 270° C., and kept at 270° C. for 90 minutes, then being lowered from 270° C. to 250° C., taking 15 minutes, while 5.4 g (0.3 mole) of water was pressure-injected. Then, the temperature was gradually lowered from 250° C. to 220° C., taking 75 minutes. The reaction system was subsequently quickly cooled near to room temperature, and the content was taken out.

After the content was taken out, the state of the reactor was almost similar to that of Example 4. However, the particle size of the polymer particles dispersed in the reaction product was larger than that of Example 1, and the viscosity of the reaction product was lower than that of Example 1. The yield of the polymer obtained after recovery work was 84%, and the melt viscosity of the polymer was 217 Pa·s. The whiteness (L value) was 64.

Example 6

This example shows the results obtained as described for Example 5, except that the water content of the low-hydrated sodium sulfide and the amount of NMP used in the polymerization for synthesizing a PPS were changed, and that sodium hydroxide was added as an alkali metal hydroxide during polymerization.

Step 1

A 1-liter autoclave made of SUS316 and having a stirrer was charged with 116.9 g of 48 wt % sodium hydrosulfide aqueous solution (1.0 mole as sodium hydrosulfide), 193.8 g of 21.7 wt % sodium hydroxide aqueous solution obtained by dissolving 96% pure sodium hydroxide into 150 g of water, 119.0 g (1.2 moles) of NMP and 10.7 g (0.13 mole) of anhydrous sodium acetate at room temperature. At this stage, the amount of water per mole of the sulfur contained in sodium sulfide on the assumption that all the charged sodium hydrosulfide was converted into sodium sulfide was 12.7 moles (228.8 g) and the amount of NMP was 1.2 moles.

A rectification tower containing a packing material was attached to the top of the autoclave through a valve, and nitrogen was fed at atmospheric pressure. With stirring, the reaction system was gradually heated up to the boiling point of NMP (205° C.), taking about 1.5 hours, for liquid elimination, to obtain 205 g of a distillate.

The distillate was analyzed by means of gas chromatography, and found to contain 203.5 g of water and 1.5 g of NMP, and it was found that at this stage, 25.3 g (1.40 moles) of water and 117.5 g (1.18 moles) of NMP remained in the reaction system.

Step 2

The heating was continued in succession, and the temperature was raised gradually up to about 255° C., taking about 1.5 hours, to obtain 98.3 g of a distillate. The distillate was analyzed by means of gas chromatography, and found to contain 18.5 g of water and 79.8 g of NMP. Thus, it was found that 6.7 g (0.37 mole) of water and 37.7 g (0.38 mole) of NMP remained in the reaction system, and that low-hydrated sodium sulfide containing 0.37 mole of water per mole of the sulfur contained could be produced.

The amount of the hydrogen sulfide scattered from the reaction system in the steps 1 and 2 was 0.003 mole.

Polymerization for Synthesis of PPS

After completion of the above step2, the valve at the top of the autoclave was closed. Then, the obtained reaction system was cooled to about 200° C., and a 100 ml pressure vessel communicating with the interior of the autoclave was attached to the top of the autoclave through a pressure valve. The interior of the autoclave was sealed in nitrogen gas. The 100 ml pressure vessel was used to pressure-inject 150.7 g (1.03 moles) of liquid p-dichlorobenzene (p-DCB) and 160.6 g (1.62 moles) of NMP into the autoclave using pressure nitrogen. At this stage, the amount of water per mole of the sulfur contained in the reaction system was 0.37 mole, and the amount of NMP was 2.0 mole. With stirring at 400 rpm, the temperature was raised from 200° C. to 238° C., taking 38 minutes, and kept at 238° C. for 90 minutes. Then, the temperature of the reaction system was raised from 238° C. to 270° C., taking 32 minutes. During the heating, at the stage when the temperature of the reaction system became 260° C., 12.8 g of a sodium hydroxide aqueous solution {obtained by dissolving 1.25 g (0.03 mole) of 96% pure sodium hydroxide into 11.3 g (0.63 mole) of water} was pressure-injected into the reaction system. As a result, the amount of water in the reaction system per mole of the sulfur contained in the reaction system became 1.0 mole. The temperature was raised to 270° C., and kept at 270° C. for 90 minutes, then being lowered from 270° C. to 250° C., taking 15 minutes, while 9.0 g (0.5 mole) of water was pressure-injected. Then, the temperature was gradually lowered from 250° C. to 220° C., taking 75 minutes. The reaction system was subsequently quickly cooled near to room temperature, and the content was taken out.

After the content was taken out, the state of the reactor was almost similar to that of Example 4. However, the particle size of the polymer particles dispersed in the reaction product was larger than that of Example 1, and the viscosity of the reaction product was lower than that of Example 1. The yield of the polymer obtained after recovery work was 83%, and the melt viscosity of the polymer was 180 Pa·s. The whiteness (L value) was 62.

From the comparison between Examples 1 to 4 and Examples 5 and 6, it can be seen that if an alkali metal hydroxide is added during polymerization, a polymer with a high polymerization degree can be more easily obtained.

Example 7

This example shows the results obtained when polymerization for synthesizing a PPS was performed using more NMP than in Examples 1 to 6.

Polymerization for Synthesis of PPS

The steps 1 and 2 were performed as described for Example 4, except that the amount of anhydrous sodium acetate charged in the step 1 was changed to 27.1 g (0.33 mole), and the valve at the top of the autoclave was closed. Then, the reaction system was cooled to about 200° C., and a 100 ml pressure vessel communicating with the interior of the autoclave was attached to the top of the autoclave through a pressure valve. The interior of the autoclave was sealed in nitrogen gas. The 100 ml pressure vessel was used to pressure-inject 150. 2 g (1.02 moles) of liquid p-dichlorobenzene (p-DCB) and 238.9 g (2.41 moles) of NMP into the autoclave using pressure nitrogen. At this stage, the amount of water per mole of the sulfur contained in the reaction system was 0.6 mole, and the amount of NMP was 3.0 mole. With stirring at 400 rpm, the temperature was raised from 200° C. to 238° C., taking 38 minutes, and kept at 238° C. for 90 minutes. Then, the temperature of the reaction system was raised from 238° C. to 270° C., taking 32 minutes. At this stage when the temperature of the reaction system was raised from 255° C. to 265° C., 16.4 g (0.9 mole) of water was pressure-injected into the reaction system. As a result, the amount of water in the reaction system per mole of the sulfur contained in the reaction system became 1.5 moles. The temperature was raised up to 270° C., and kept at 270° C. for 90 minutes. Then, the temperature was lowered from 270° C. to 250° C., taking 15 minutes, and lowered gradually from 250° C. to 220° C., taking 75 minutes. Subsequently the reaction system was quickly cooled near to room temperature, and the content was taken out.

After the content was taken out, the state of the reactor was almost similar to that of Example 4. The particle size of the polymer particles dispersed in the reaction product was larger than that of Example 1, and the viscosity of the reaction product was lower than that of Example 1. The yield of the polymer obtained after recovery work was 91%, and the melt viscosity of the polymer was 245 Pa·s. The whiteness (L value) was 66.

From the comparison between Examples 1 to 6 and Example 7, it can be seen that if the amount of NMP used during polymerization is larger, a polymer with a further higher polymerization degree can be easily obtained.

The invention claimed is:

1. A method for producing a polyarylene sulfide, comprising a step of bringing a low-hydrated alkali metal sulfide containing 0.05 to less than 0.8 mole each of water and an organic amide solvent per mole of the sulfur contained in the alkali metal sulfide, into contact with a dihalogenated aromatic compound in an organic polar solvent for polymerization, wherein the low-hydrated alkali metal sulfide is obtained by a method of eliminating an organic amide solvent and water from a mixture containing at least (a) an alkali metal sulfide, (b) 0.8 to 10 moles of the organic amide solvent and (c) 0.8 to 20 moles of water, respectively, per mole of the sulfur contained in the alkali metal sulfide, to adjust the water content and the organic amide solvent content of the mixture respectively into the range of from 0.05 mole to less than 0.8 mole per mole of the sulfur contained in the alkali metal sulfide.

2. A method for producing a polyarylene sulfide, according to claim 1, wherein the low-hydrated alkali metal sulfide is obtained from a mixture containing at least (a) an alkali metal sulfide, (b) 0.8 to 10 moles of an organic amide solvent and (c) 0.8 to 20 moles of water, respectively, per mole of the sulfur contained in the alkali metal sulfide, by a method comprising at least the following two steps:

step 1: the mixture is treated for liquid elimination at a temperature riot higher than the boiling point of the organic amide solvent, to adjust the water content of the mixture into a range from 0.8 mole to 2.0 moles per mole of the sulfur contained in the charged alkali metal sulfide; and step 2: the mixture obtained in the step 1 is treated for liquid elimination at a temperature not lower than the boiling point of the organic amide solvent for eliminating water and the organic amide solvent, to adjust the water content and the organic amide solvent content of the mixture respectively into a range from 0.05 mole to less than 0.8 mole per mole of the sulfur contained in the alkali metal sulfide.

3. A method for producing a polyarylene sulfide, according to claim 1, wherein the low-hydrated alkali metal sulfide is obtained from a mixture containing at least (a) an alkali metal sulfide, (b) 0.95 to 10 moles of an organic amide solvent and (c) 0.8 to 20 moles of water, respectively, per mole of the sulfur contained in the alkali metal sulfide.

4. A method for producing an arylene sulfide, according to claim 1, wherein the whiteness (L value) of the obtained polyarylene sulfide is 55 or more.

5. A method for producing a polyarylene sulfide, according to claim 1, wherein at least a part of the polymerization is performed in the presence of at least one compound selected from organic metal carboxylates, aliphatic cyclic amine compounds, N-heteroaromatic compounds and organic sulfoxide compounds.

6. A method for producing a polyarylene sulfide, according to claim 1, wherein an alkali metal hydroxide is added during polymerization, to further continue the polymerization.

* * * * *